(12) United States Patent
Kubota et al.

(10) Patent No.: US 10,341,683 B1
(45) Date of Patent: Jul. 2, 2019

(54) APPARATUS AND METHOD TO REDUCE AN AMOUNT OF COORDINATE DATA REPRESENTING AN OBJECT TAKEN BY AN IMAGING DEVICE IN A THREE DIMENSIONAL SPACE

(71) Applicant: FUJITSU LIMITED, Kawasaki-shi, Kanagawa (JP)

(72) Inventors: Tomonori Kubota, Kawasaki (JP); Yasuyuki Murata, Shizuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/182,663

(22) Filed: Nov. 7, 2018

(30) Foreign Application Priority Data

Dec. 26, 2017 (JP) .................................. 2017-249425

(51) Int. Cl.
  *H04N 19/597* (2014.01)
  *H04N 13/111* (2018.01)
  *G06T 7/55* (2017.01)

(52) U.S. Cl.
  CPC ............. *H04N 19/597* (2014.11); *G06T 7/55* (2017.01); *H04N 13/111* (2018.05)

(58) Field of Classification Search
  CPC .......... G06T 2207/10012; G06T 7/593; H04N 13/239
  See application file for complete search history.

(56) References Cited

U.S. PATENT DOCUMENTS 5,818,959 A   10/1998 Webb et al.
6,333,749 B1 * 12/2001 Reinhardt .............. G01C 11/00
                                                     345/619
8,180,114 B2 *  5/2012 Nishihara ............... G06F 3/017
                                                     382/103
2006/0184545 A1  8/2006 Suzuki
2010/0253861 A1* 10/2010 Tomaru ................ H04N 9/3147
                                                     348/745
2017/0339400 A1* 11/2017 Hall ........................ H04N 5/247

FOREIGN PATENT DOCUMENTS

JP      11-512856      11/1999
JP      2000-331160    11/2000
JP      2006-236334     9/2006

* cited by examiner

*Primary Examiner* — Edward Park
(74) *Attorney, Agent, or Firm* — Fujitsu Patent Center

(57) ABSTRACT

An apparatus obtains a second straight-line by mapping a first straight-line passing a projection center of a target-image taken by a first imaging-device in a three-dimensional space and a point representing an object in a projection-plane of the first imaging-device, onto each of reference-images respectively taken by second imaging-devices, and generates a line-segment representing an existing-range of the object on the second straight-line for each reference-image. The apparatus stores the coordinate-value of the second-endpoint and a difference between coordinate-values of the first-endpoint and a second-endpoint of the line-segment in a memory. The apparatus restores the coordinate-value of the first-endpoint from the coordinate-value of the second-endpoint and the difference stored in the memory, maps the coordinate-values of the endpoints, onto a depth-direction line of the projection plane of the first imaging-device, and determines overlap of the line-segments on the depth-direction line, based on the mapped coordinate-values.

15 Claims, 35 Drawing Sheets

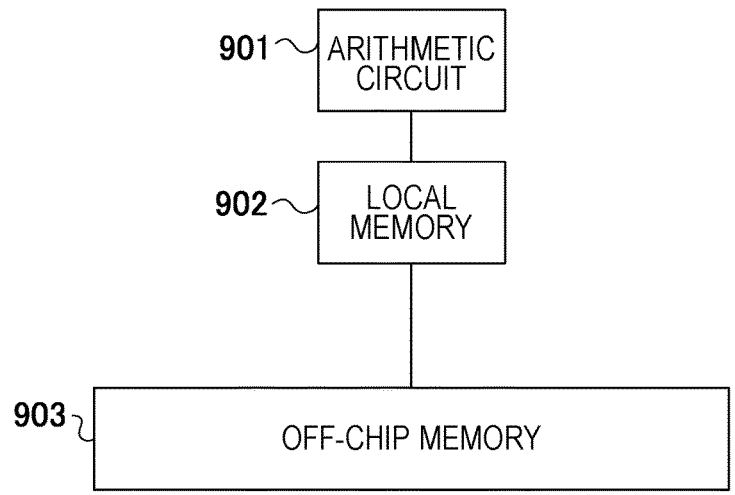
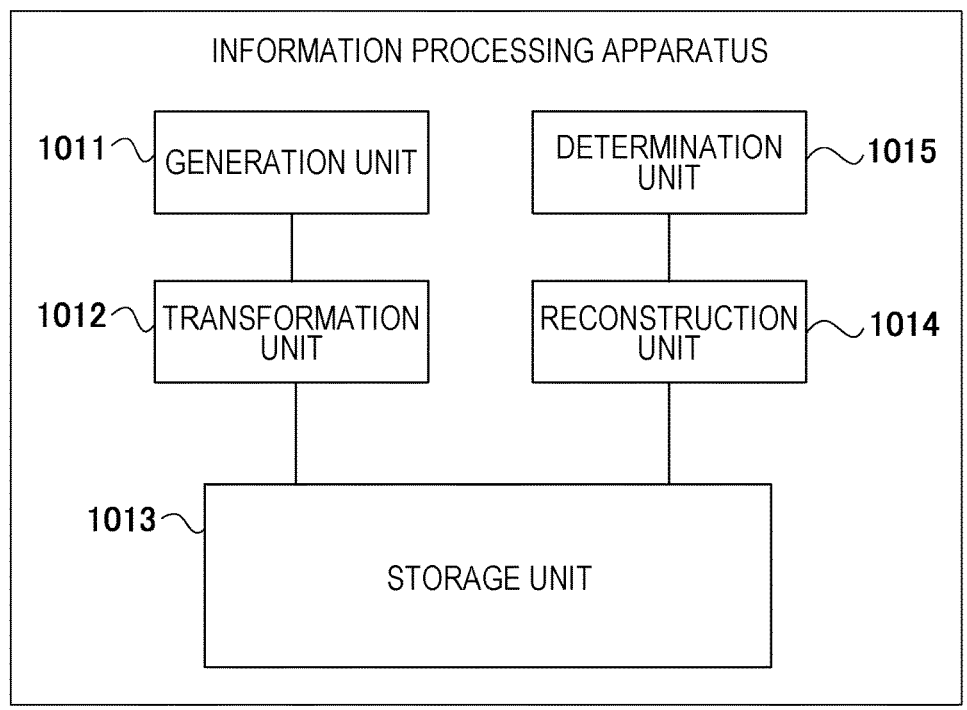

FIG. 15

| MOVING DIRECTION | SIGN |
|---|---|
| POSITIVE DIRECTION | + |
| NEGATIVE DIRECTION | − |

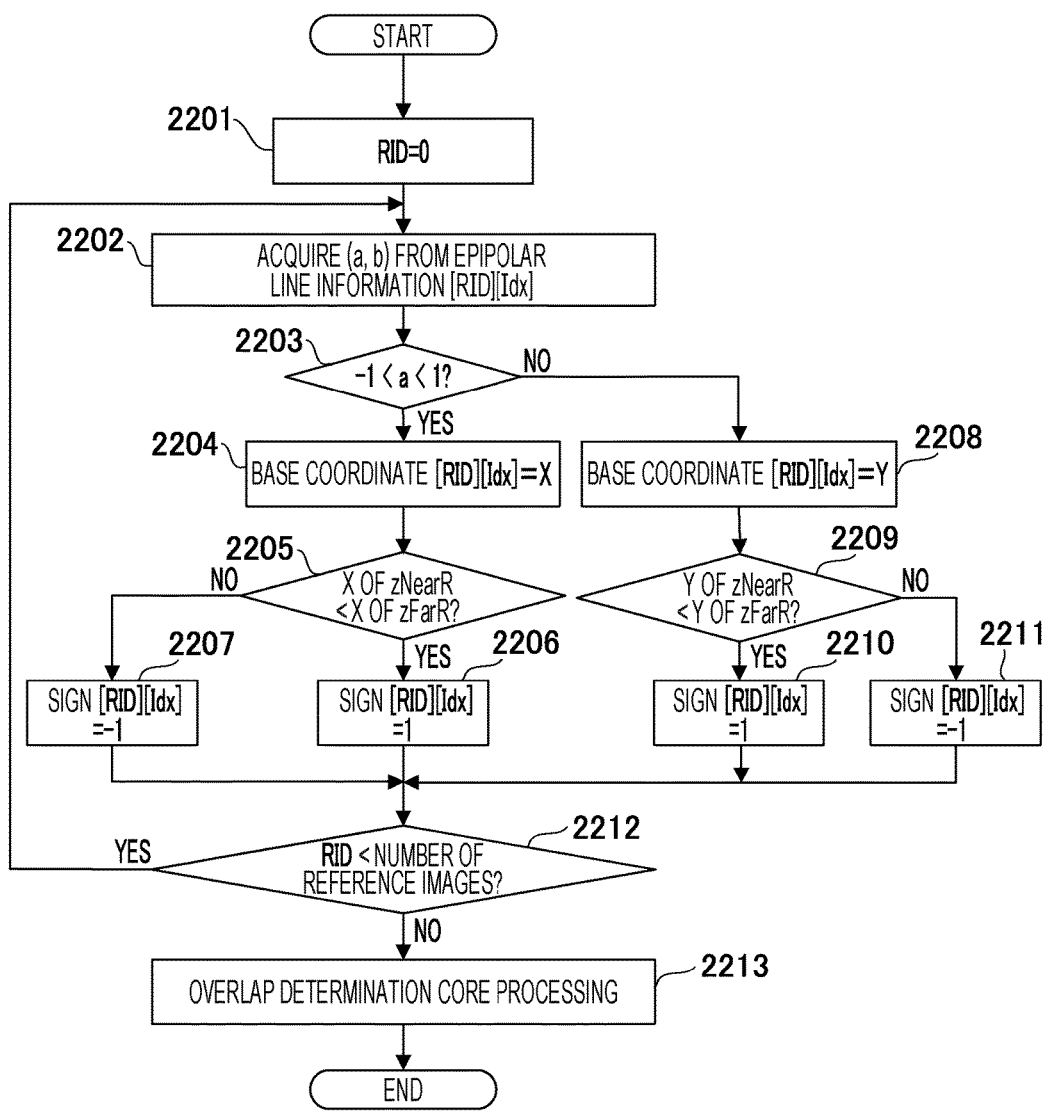

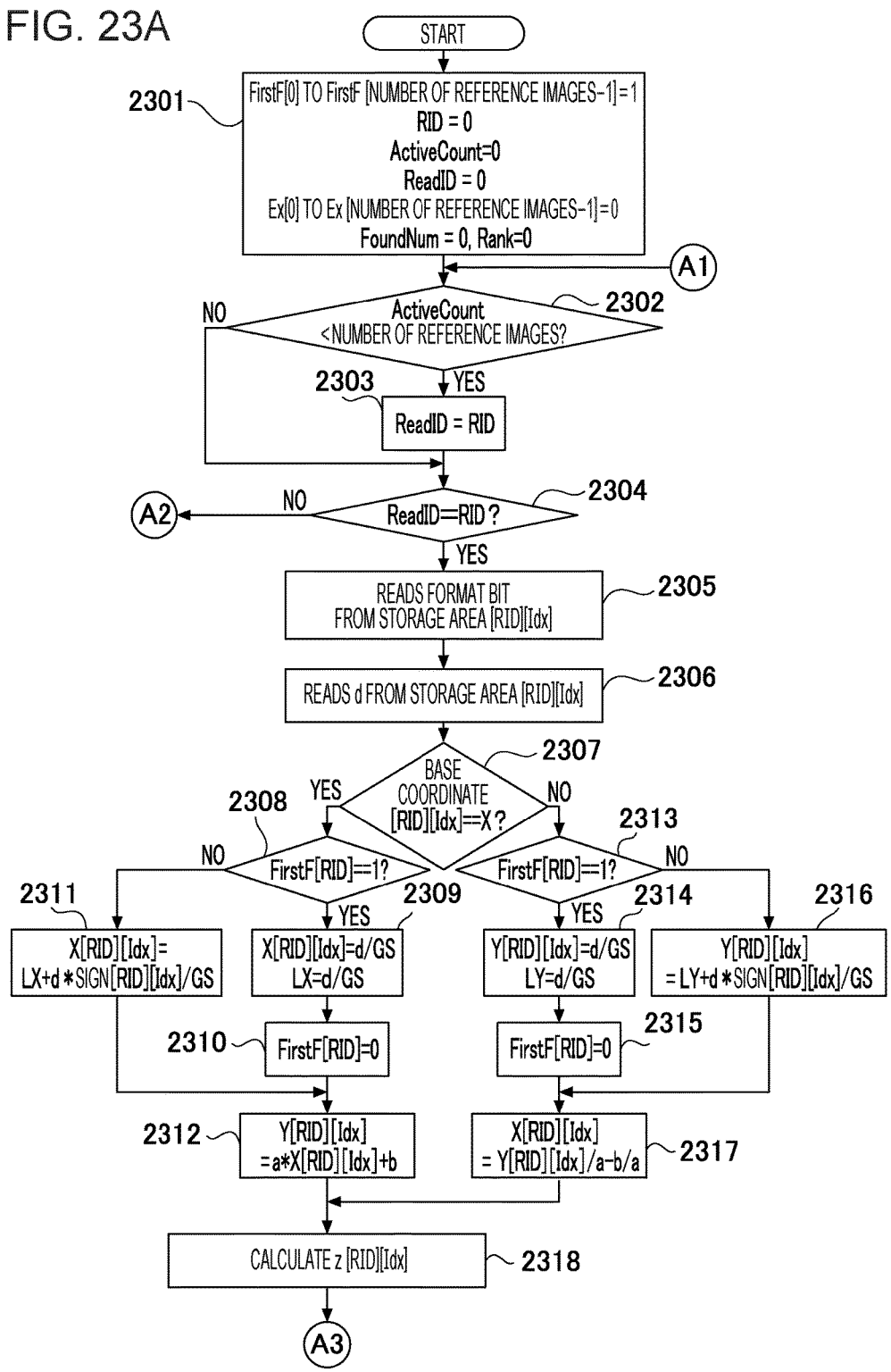

| 10.0 | 15.0 | 19.0 | 25.0 | 2000.0 |
|---|---|---|---|---|

FIG. 26A

| 0 | 10 | 0 | 5 | 0 | 4 | 0 | 6 | 1 | 1975 |
|---|---|---|---|---|---|---|---|---|---|

FIG. 26B

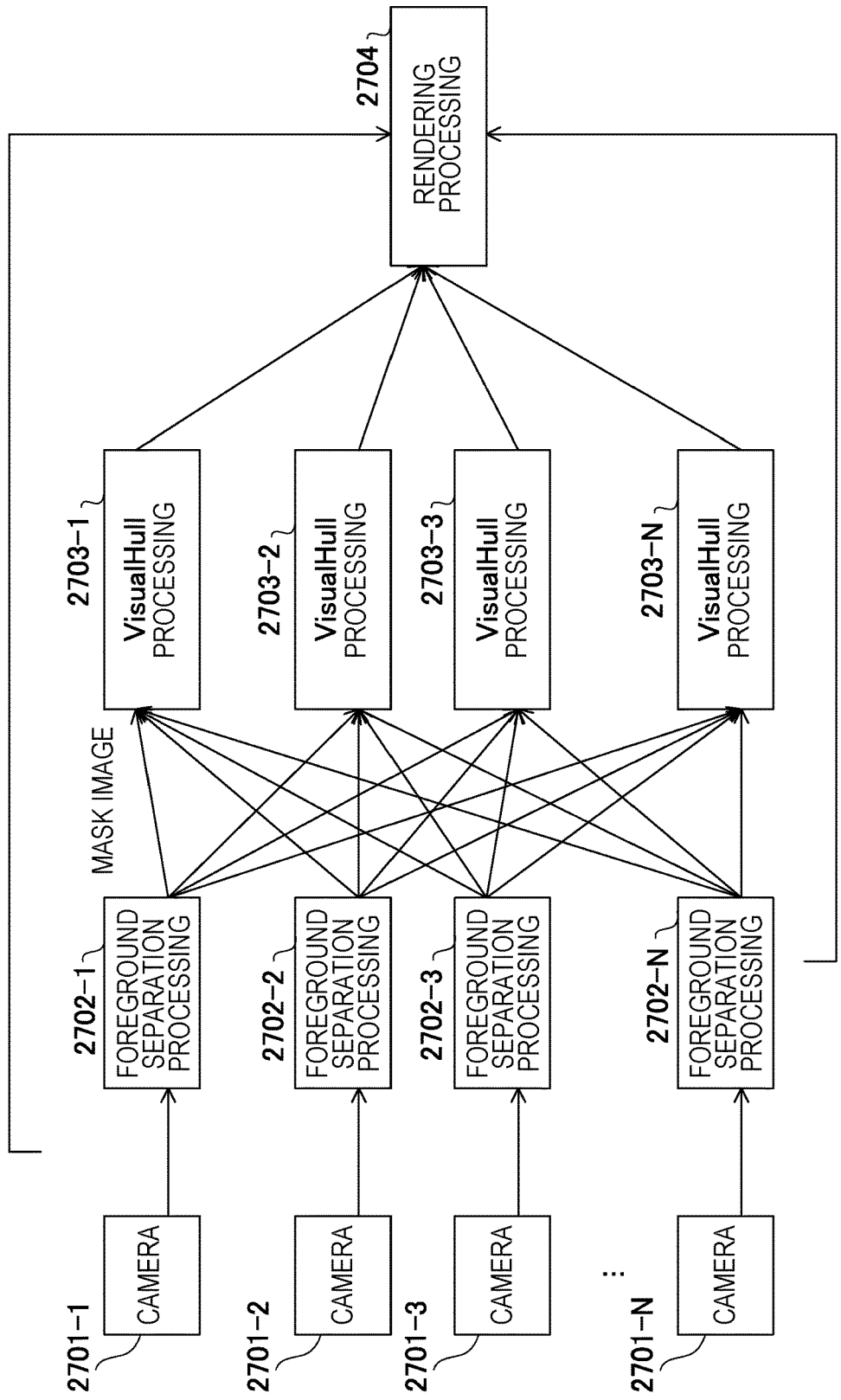

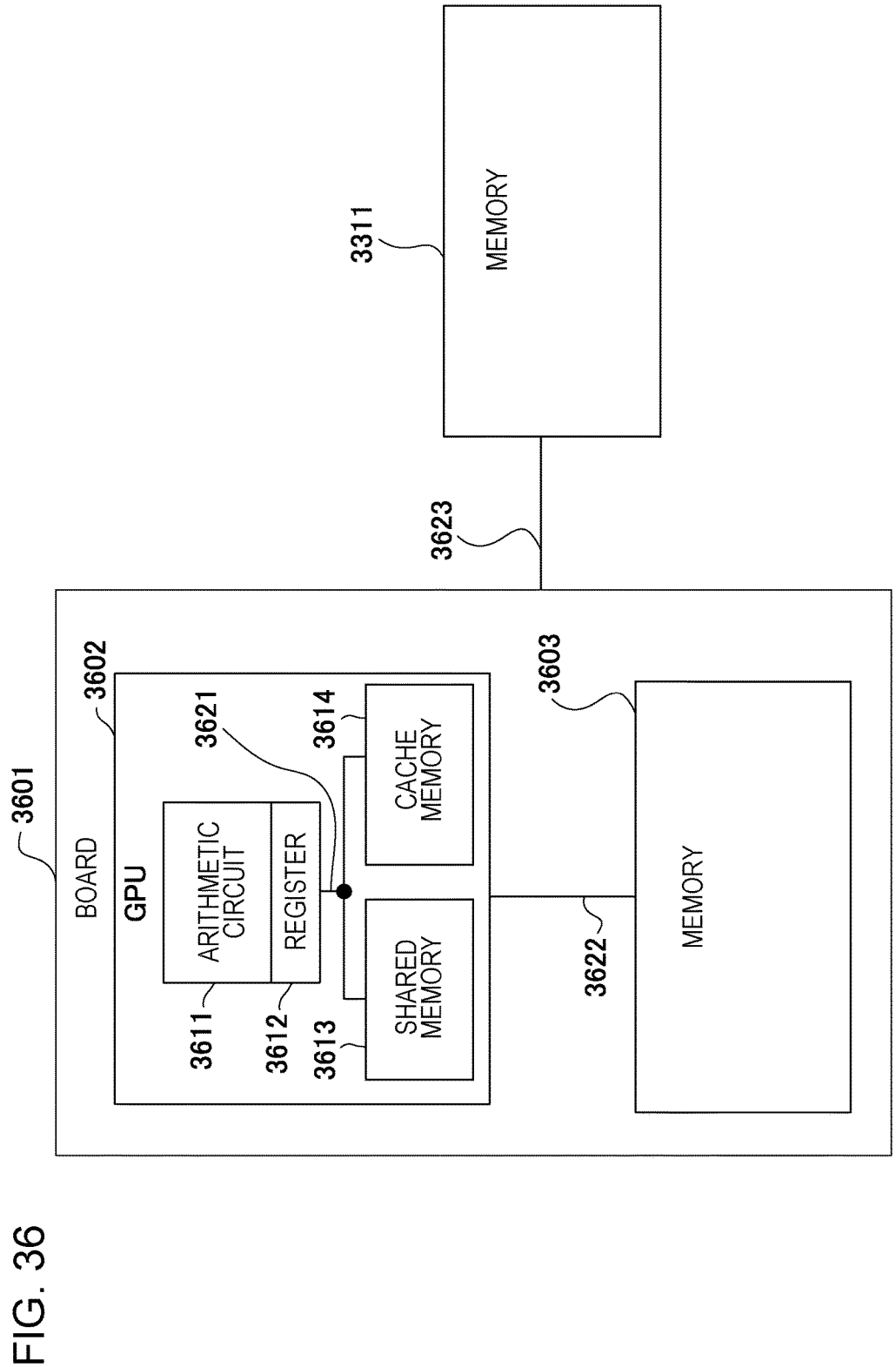

APPARATUS AND METHOD TO REDUCE AN AMOUNT OF COORDINATE DATA REPRESENTING AN OBJECT TAKEN BY AN IMAGING DEVICE IN A THREE DIMENSIONAL SPACE

CROSS-REFERENCE TO RELATED APPLICATION

This application is based upon and claims the benefit of priority of the prior Japanese Patent Application No. 2017-249425, filed on Dec. 26, 2017, the entire contents of which are incorporated herein by reference.

FIELD

The embodiment discussed herein is related to apparatus and method to reduce an amount of coordinate data representing an object taken by an imaging device in a three dimensional space.

BACKGROUND

Recently, the technique referred to as VisualHull is used to reconstruct the three dimensional shape of an object included in a multi-viewpoint video from a silhouette image of the object. According to the VisualHull, cross multiply of a plurality of silhouette cones from multiple viewpoints is recognized as the three dimensional shape of the object.

The technique of transmitting drawing differential information from a server to a client, the technique of constructing a three dimensional image from a plurality of two-dimensional images, and the technique of performing matching between a plurality of images to reconstruct three dimensional information have been known (For example, refer to Japanese Laid-open Patent Publication Nos. 2006-236334 and 2000-331160, and Japanese National Publication of International Patent Application No. 11-512856).

SUMMARY

According to an aspect of the embodiments, an apparatus obtains a second straight line by mapping a first straight line that passes a projection center of a target image taken by a first imaging device in a three dimensional space and a point representing an object in a projection plane of the first imaging device, onto each of a plurality of reference images respectively taken by a plurality of second imaging devices, and generates a reference line-segment representing an existing range of the object on the second straight line for each of the plurality of reference images. The apparatus transforms, for each of the plurality of reference line-segments respectively generated on the plurality of reference images, a coordinate value of a first endpoint of the reference line-segment into a difference between a coordinate value of the first end point and a coordinate value of a second endpoint of the reference line-segment, and stores the coordinate value of the second endpoint and the difference in the memory. The apparatus restores the coordinate value of the first endpoint from the coordinate value of the second endpoint and the difference stored in the memory, maps the coordinate value of the second endpoint and the restored coordinate value of the first endpoint, onto a depth-direction line that is perpendicular to the projection plane of the first imaging device, and determines overlap of a plurality of line-segments on the depth-direction line whose endpoints are mapped from each of the plurality of reference line-segments on the plurality of reference images.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a view illustrating a hardware configuration of the three dimensional shape construction unit;
FIG. 10 is a view illustrating a functional configuration of an information processing apparatus;
FIG. 15 is a view illustrating a method of determining a sign;
FIG. 22 is a flow chart of overlap determination processing;
FIG. 23A is a flow chart (1) of the overlap determination core processing;
FIGS. 26A and 26B are views illustrating a storage area for storing the search result;
FIG. 27 is a view illustrating free multi-viewpoint video generation processing.

FIG. 36 is a second configuration view of the arithmetic unit.

DESCRIPTION OF EMBODIMENTS

In VisualHull, to confirm whether or not a point (silhouette) acquired by projecting an object in a three dimensional space onto an image taken by a camera exists on an epipolar line, line-segment search for searching a line segment representing an existing range of the object (intersection search) is performed. Then, coordinate values of a plurality of line segments searched on the image taken by each of a plurality of cameras are stored in a memory, and the coordinate values of the line segments are used to determine overlap of the plurality of line segments in the three dimensional space. However, when the number of line segments searched in line-segment search increases, an overhead of memory access becomes large.

Such problem occurs when the line segments on the epipolar line are searched in VisualHull, as well as when the line segment representing the object existing range is generated in an image taken with an imaging device by any other method.

It is preferable to reduce the amount of coordinate data on the line segment representing the object existing range in the image taken by the imaging device.

An embodiment will be described below in detail with reference to figures.

Figure 1:
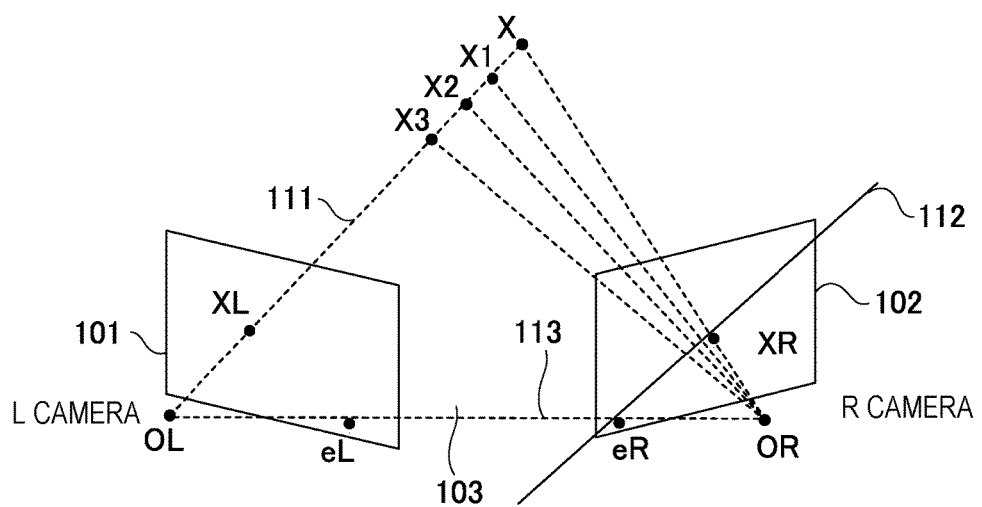
FIG. 1 is a view illustrating epipolar geometry.

FIG. 1 illustrates an example of epipolar geometry. The epipolar geometry is a geometry for reconstructing three dimensional depth information from two images of different viewpoints. Out of two cameras, a base camera is defined as the L camera, and a reference camera is defined as a R camera. A projection center OL of the L camera corresponds to the viewpoint of the L camera, and the projection center OR of the R camera corresponds to the viewpoint of the R camera. A point eL acquired by projecting the projection center OR onto a projection plane 101 of the L camera, and a point eR acquired by projecting the projection center OL onto a projection plane 102 of the R camera each are referred to as an epipole.

An epipolar line 112 is derived by projecting a straight line 111 that passes the projection center OL and a point XL acquired by projecting a point X in a three dimensional space on the projection plane 101, onto the projection plane 102. The point X on the straight line 111 is projected onto a point XR on the epipolar line 112, and the point X1 to point X3 on the straight line 111 are also projected onto the epipolar line 112. On the projection plane 101, the straight line 111 is projected onto the point XL.

One of the L camera and the R camera may view the other camera, the projection center OR of the R camera is projected onto the epipole eL, and the projection center OL of the L camera is projected onto the epipole eR. Accordingly, the epipole eL and the epipole eR exist on a straight line 113 that passes the projection center OL and the projection center OR in the three dimensional space.

The epipolar line 112 is uniquely determined depending on the position of the point X in the three dimensional space, and all epipolar lines respectively corresponding to a plurality of points in the three dimensional space pass the epipole eR. In other words, all straight lines passing the epipole eR on the projection plane 102 are epipolar lines. An epipolar plane 103 is a plane including the projection center OL, the projection center OR, and the point X, and an intersection line of the epipolar plane 103 and the projection plane 102 matches the epipolar line 112.

In the case where the positional relation between the L camera and the R camera is known, following epipolar restrictions hold.

(1) When the point XL acquired by projecting the point X onto the projection plane 101 is given, the epipolar line 112 on the projection plane 102 is defined.

(2) The point XR acquired by projecting the point X onto the projection plane 102 exists somewhere on the epipolar line 112.

Accordingly, if the L camera and the R camera capture the same point X, the point X is necessarily projected onto the epipolar lines of both the L camera and the R camera. On the contrary, if the point X is not projected onto the epipolar lines, the cameras do not capture the same point X. In other words, the epipolar lines are not correctly associated with each other. A position of the projection plane of one camera onto which the point X viewed from the other camera is projected may be found by searching the epipolar lines. If the epipolar lines are correctly associated with each other and the positions of the point XL and the point XR are known, the position of the point X in the three dimensional space may be determined by trigonometry.

In VisualHull, to confirm whether or not a point of the projection plane 102, onto which an object in the three dimensional space is projected, exists on the epipolar line 112, line-segment search is performed. In this case, a search range for the object on the straight line 111 is set, and the search range is projected onto the epipolar line 112 to determine the search range of line segment search. The search range for the object on the straight line 111 may be a range in which the object physically exists or a narrower range.

Figure 2:
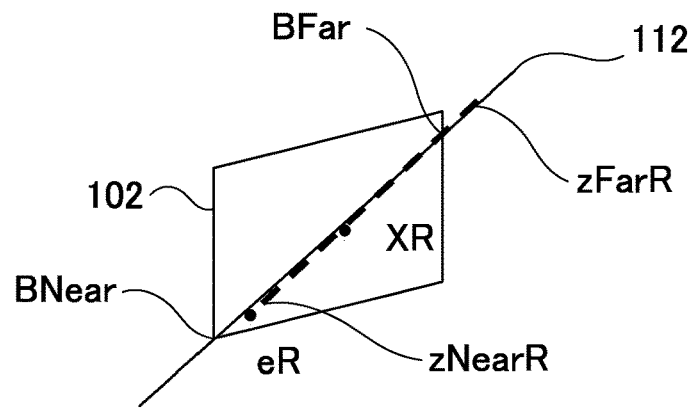
FIG. 2 is a view illustrating a search range of line segment search.

FIG. 2 illustrates an example of the search range of line-segment search on the epipolar line 112. zNearR is a point acquired by projecting a nearest point to the projection center OL in the search range for the object on the straight line 111 onto the projection plane 102. zFarR is a point acquired by projecting a farthest point from the projection center OL onto the projection plane 102. Accordingly, zNearR is a nearest point to the epipole eR among points acquired by projecting the search range for the object on the straight line 111 onto the projection plane 102, and zFarR is a farthest point from the epipole eR among the points acquired by projecting the search range for the object on the straight line 111 onto the projection plane 102.

Meanwhile, a window corresponding to a field of view of the R camera is set on the projection plane 102. Out of two intersections of the epipolar line 112 and an edge of the window on the projection plane 102, BNear is a nearer point to the epipole eR, and BFar is a further point from the epipole eR.

For example, a range from Max (zNearR, BNear) to Min (zFarR, BFar) is set as the search range of line-segment search on the epipolar line 112. Out of zNearR and BNear, Max (zNearR, BNear) is a further point from the epipole eR, and out of zFarR and BFar, Min (zFarR, BFar) is a nearer point to the epipole eR.

Figure 3:
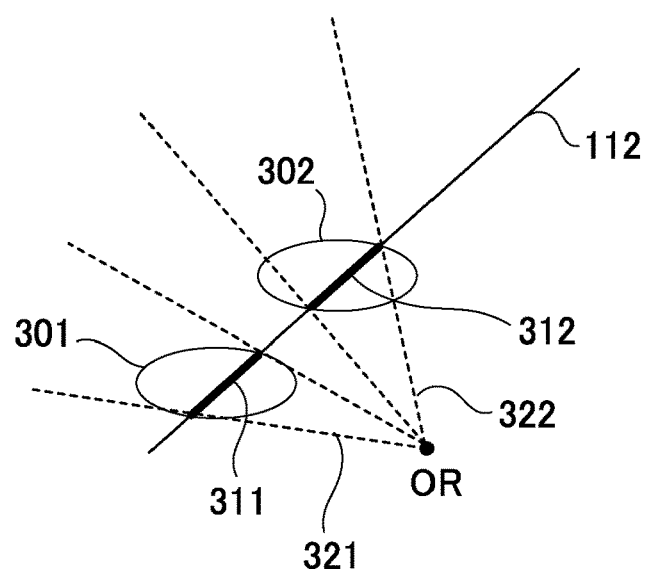
FIG. 3 is a view illustrating visual cone of an object.

FIG. 3 illustrates an example of a silhouette cone of an object. A silhouette 301 and a silhouette 302 represent respective regions in which two objects in the three dimensional space are projected onto the projection plane 102. A line segment 311 is a portion of the epipolar line 112 included in the silhouette 301, and a line segment 312 is a portion of the epipolar line 112 included in the silhouette 302. Using the projection center OR as a reference, the line segment 311 is projected onto the three dimensional space to derive a silhouette cone 321, and the line segment 312 is projected onto the three dimensional space to derive a silhouette cone 322.

According to the VisualHull, the three dimensional shape of the object is generated by using a plurality of silhouette cones derived when the object is viewed from a plurality of reference cameras (R camera). Thus, line segment search is performed in the image taken by each of the reference cameras, thereby searching for a line segment representing an overlapping range of the silhouette and the epipolar line.

Out of two endpoints of the line segment searched for, the nearer endpoint to the epipole eR is a candidate for the position of a front surface of the object viewed from the base camera (L camera), the further endpoint from the epipole eR is a candidate for the position of a back face of the object. Out of two points acquired by projecting the two endpoints of each line segment onto the straight line 111 in FIG. 1, the nearer point to the projection center OL represents the position of the surface viewed from the projection center OL.

Figure 4:
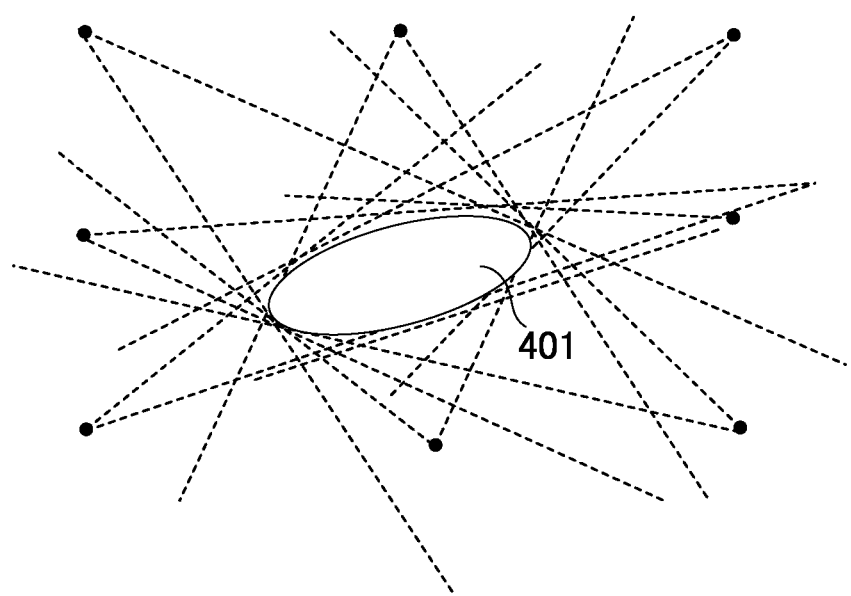
FIG. 4 is a view illustrating silhouette cones when viewed from multiple viewpoints.

FIG. 4 illustrates an example of silhouette cones viewed from multiple viewpoints. First, among a plurality of cameras corresponding to the plurality of viewpoints, one camera is designated as the base camera, and the other cameras are designated as the reference cameras.

Next, for each point (pixel) included in the silhouette in the window of the base camera, a plurality of silhouette cones derived when an object 401 is viewed from the plurality of reference cameras are found to identify the position of the front surface of the object, which corresponds to the concerned pixel. Then, by sequentially designating the cameras as the base camera, the position of the front surface of the object viewed from a plurality of viewpoints may be identified, such that the three dimensional shape of the object is extracted.

In identifying the position of the front surface of the object, which corresponds to each pixel in the window of the base camera, the overlap of a plurality of line segments searched in the respective windows of the plurality of reference cameras is determined in a depth direction which is a direction perpendicular to the projection plane 101 of the L camera.

Figure 5:
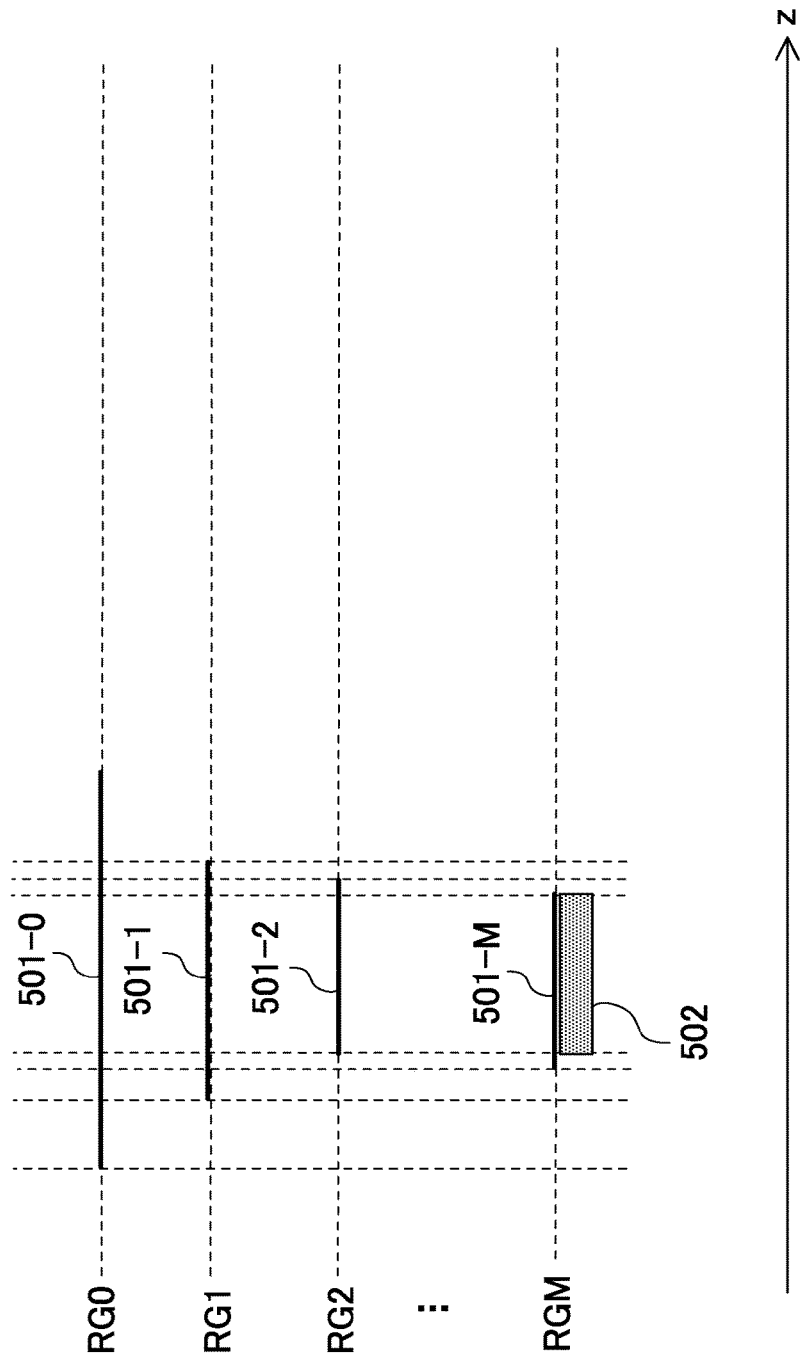
FIG. 5 is a view illustrating overlap determination processing.

FIG. 5 illustrates an example of overlap determination processing of the plurality of line segments. In this example, M+1 (M is an integer of 1 or more) reference cameras are used, and a reference image RGi (i=0 to M) refers to an image taken by $i^{th}$ reference camera. A z-axis represents a straight line in the depth direction, which passes a target pixel in a target image taken by the base camera, and is orthogonal to the projection plane of the base camera. A coordinate value of a z-coordinate becomes larger as it separates from the viewpoint of the base camera.

A line segment 501-$i$ is a line segment acquired by projecting the line segment searched on the epipolar line, which is acquired by projecting the straight line 111 in FIG. 1 onto the reference image RGi, onto the z-axis. A range 502 in which the line segment 501-0 to the 501-M overlap each other on the z-axis is determined as an existing range of the object in the three dimensional space. However, in the case where the object exists outside the field of view of any reference camera, the reference image taken by the reference camera is not subjected to the overlap determination processing.

Figure 6:
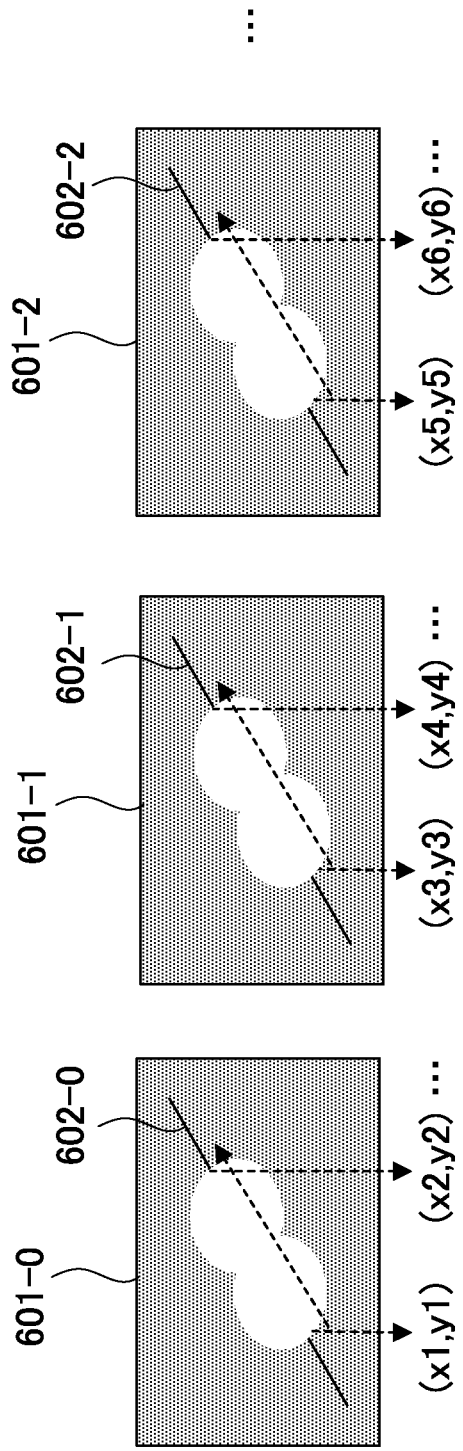
FIG. 6 is a view illustrating mask images.

FIG. 6 illustrates an example of a mask image generated from the reference image RGi. A mask image 601-$i$ is generated by extracting an object region in which an object is imaged, from the reference image RGi, and setting pixel values that distinguish the object region from the other background region. Then, endpoints of the line segment that represents the object-existing range are found by searching the epipolar line 602-$i$ in the reference image RGi for intersections of the boundary of the object region included in the mask image 601-$i$ and an epipolar line 602-$i$.

For example, (x1, y1) and (x2, y2) are coordinate values of the endpoints of the line segment found from the mask image 601-0 and the epipolar line 602-0. (x3, y3) and (x4, y4) are coordinate values of the endpoints of the line segment found from the mask image 601-1 and the epipolar line 602-1. (x5, y5) and (x6, y6) are coordinate values of the endpoints of the line segment found from the mask image 601-2 and the epipolar line 602-2.

Figure 7:
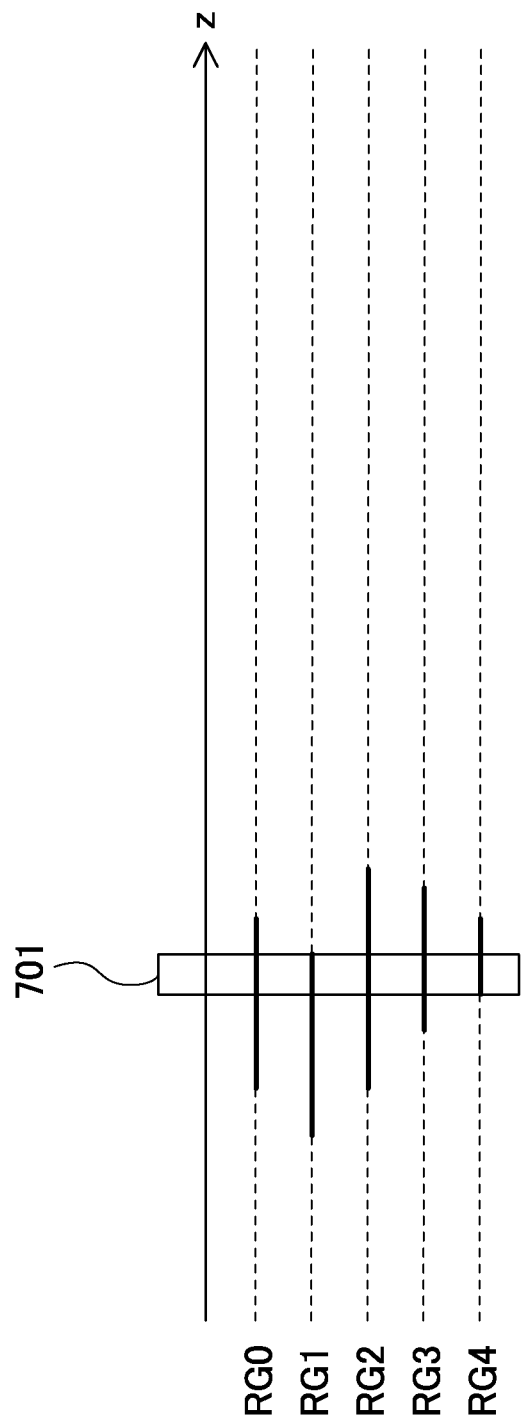
FIG. 7 is a view illustrating the overlap determination processing of five line segments.

FIG. 7 illustrates an example of the overlap determination processing of five line-segments generated from the reference images RG0 to RG4. The five line segments acquired by projecting these line-segments onto the z-axis overlap each other in a range 701 and thus, the range 701 is determined as the object existing range in the three dimensional space.

Figure 8:
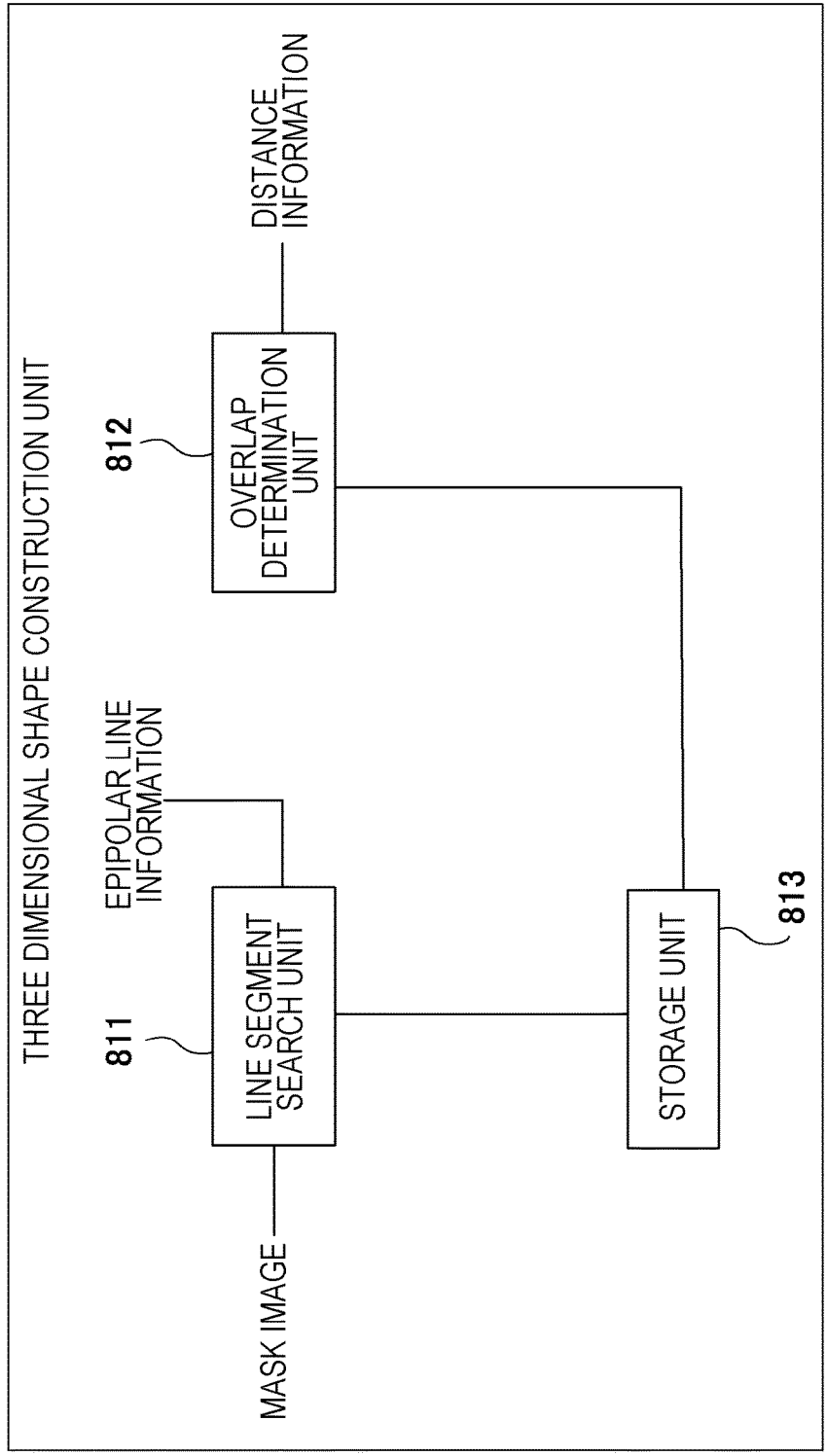
FIG. 8 is a view illustrating a functional configuration of a three dimensional shape construction unit.

FIG. 8 illustrates an example of a functional configuration of a three dimensional shape construction unit for finding the three dimensional shape of the object by VisualHull. A three dimensional shape construction unit 801 in FIG. 8 includes a line segment search unit 811, an overlap determination unit 812, and a storage unit 813.

The line segment search unit 811 executes line-segment search processing of searching the line-segment on the epipolar line by using the mask image generated from each reference image and epipolar line information indicating the epipolar line in each reference image. Then, the line segment search unit 811 stores coordinate values of the endpoints of the searched line-segment (line-segment end coordinate values) in the storage unit 813. The overlap determination unit 812 reads the line-segment end coordinate values from the storage unit 813, and executes the overlap determination processing to find the object existing range on the z-axis. Then, the overlap determination unit 812 outputs distance information indicating the z-coordinate values of the found existing range.

However, with the configuration of the three dimensional shape construction unit 801 in FIG. 8, in the case where a lot of line segments are subjected to the overlap determination processing, performances of writing and reading of the line-segment end coordinate values may be lowered.

FIG. 9 illustrates an example of a hardware configuration of the three dimensional shape construction unit 801 in FIG. 8. The three dimensional shape construction unit 801 in FIG. 9 includes an arithmetic circuit 901, a local memory 902, and an off-chip memory 903. The arithmetic circuit 901 operates as the line segment search unit 811 and the overlap determination unit 812, and executes the line-segment search processing and the overlap determination processing.

The local memory 902 and the off-chip memory 903 are used as the storage unit 813, and store the line-segment end coordinate values. The local memory 902 is a memory having a small size and a small latency, such as a shared memory or a cache memory. On the contrary, the off-chip memory 903 is a memory having a large size and a large latency.

In the case where a lot of line segments are searched in the line-segment search processing and thus it is impossible to store all of the line-segment end coordinates into the local memory 902, the line-segment end coordinate values are also stored in the off-chip memory 903. In this case, a load time taken to load the line-segment end coordinate values from the off-chip memory 903 into the local memory 902 is extended, thereby increasing overheads of reading/writing with respect to the off-chip memory 903.

For example, in the overlap determination processing, the line-segment end coordinate values in each reference image are transformed into a coordinate system in the three dimensional space common to all the reference images. Then, the transformed z-coordinate values of all the line segments are subjected to sort processing or comparison processing, thereby settling the positional relation among the line segments to determine the overlap of the line segments. In this case, since data transfer often occurs between processing steps using a work area, the arithmetic circuit 901 frequently accesses the local memory 902.

Thus, data may be read from the off-chip memory 903 once and cached into the local memory 902, and high-frequency access may be made within the local memory 902, thereby making the overlap determination processing more efficient. However, if all of the data under processing is not be stored in the local memory 902, overheads of reading data from the off-chip memory 903 becomes large.

In addition, a bottleneck may be generated by the access from a plurality of threads running in the arithmetic circuit 901 in parallel to the local memory 902 or the off-chip memory 903.

Since the line-segment search processing and the overlap determination processing according to VisualHull may be executed at high parallelism, one arithmetic step (processing time) in the line-segment search processing and one arithmetic step in the overlap determination processing each are short.

The line-segment search processing may be individually executed for each silhouette pixel included in the mask image of each reference image and further, for each reference image. For example, in the case where an object is imaged with 21 reference cameras each having a resolution of 5K (5120×3840), and 30% of each reference image is silhouette, a maximum degree of parallelism PS of the line-segment search processing is calculated by a following equation.

$$PS=5120\times3840\times0.3\times21=123863040 \quad (1)$$

However, actually, the line-segment search processing for each reference image is sequentially executed, and is restricted by the allowable number of simultaneous calculations of the arithmetic circuit 901. Thus, the active degree of parallelism may be about a few thousands.

The overlap determination processing may be individually executed for each silhouette pixel included in the mask image of the target image. For example, in the case where 30% of the target image having a resolution of 5K, a maximum degree of parallelism PD of the overlap determination processing is calculated by a following equation.

$$PD=5120\times3840\times0.3=5898240 \quad (2)$$

However, actually, since the processing is restricted by the allowable number of simultaneous calculations of the arithmetic circuit 901, the active degree of parallelism may be about a few thousands.

As described above, in the line-segment search processing or the overlap determination processing, a few thousands of threads running in the arithmetic circuit 901 in parallel access the local memory 902 or the off-chip memory 903. For this reason, the number of line segments to be searched increases in proportion to the number of threads running in parallel. As a result, a performance limit of a memory access mechanism as hardware may cause a bottleneck.

In order to reduce the overheads of reading/writing with respect to the off-chip memory 903 and suppress the bottleneck in memory access, it is effective to reduce the data amount of the line-segment end coordinate values, and contain the line-segment end coordinate values within the local memory 902 as much as possible.

FIG. 10 illustrates an example of a functional configuration of an information processing apparatus according to an embodiment. An information processing apparatus 1001 in FIG. 10 includes a generation unit 1011, a transformation unit 1012, a storage unit 1013, a reconstruction unit 1014, and a determination unit 1015.

Figure 11:
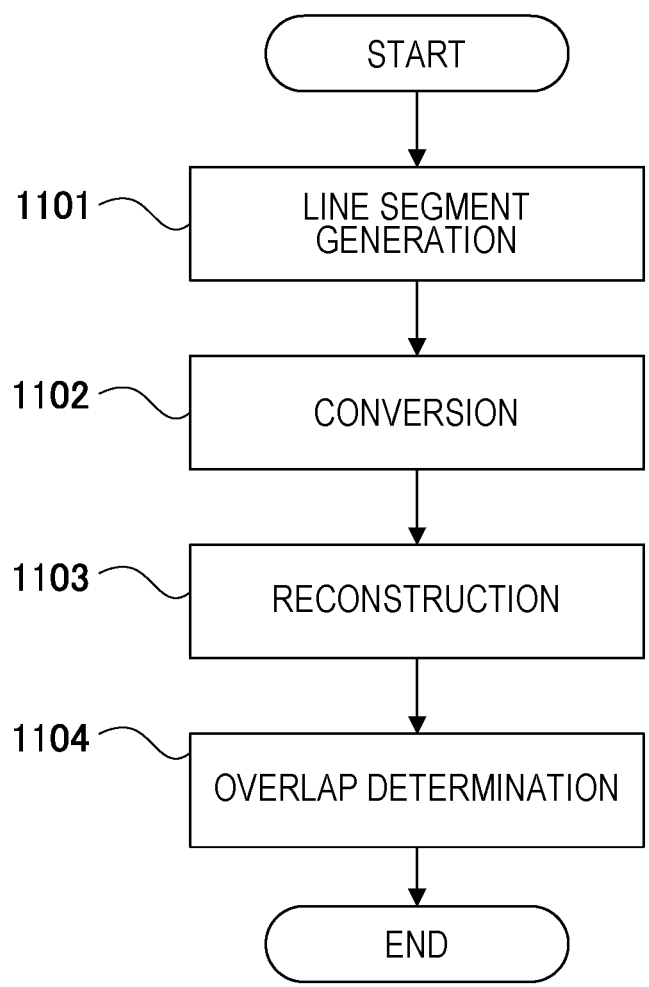
FIG. 11 is a flow chart illustrating image processing.

FIG. 11 is a flowchart illustrating an example of image processing executed by the information processing apparatus 1001 in FIG. 10. First, the generation unit 1011 generates a line segment representing the object existing range on a second straight line on which a first straight line that passes a projection center of a base imaging device in the three dimensional space and a point representing the object in a projection plane of the base imaging device is mapped onto each of a plurality of reference images respectively taken by a plurality of reference imaging devices other than the base imaging device (Step 1101). The plurality of reference images are respectively taken by reference imaging devices other than the base imaging device having the above-mentioned projection center and the above-mentioned projection plane.

For each of the plurality of line segments generated from the plurality of reference images, the transformation unit 1012 transforms coordinate values of one endpoint of the line segment in the reference image into a difference between the coordinate values of the one endpoint and coordinate values of the other endpoint (Step 1102). Then, storage unit 1013 stores the coordinate values of the other endpoint and the difference.

The reconstruction unit 1014 reconstructs coordinate values of the one endpoint from the coordinate values of the other endpoint and the difference, which are stored in the storage unit (Step 1103). The determination unit 1015 determines the overlap of the plurality of line segments in the depth direction of the projection plane of the base imaging device, based on a result of mapping of the coordinate values of the other endpoint and the coordinate values of the one endpoint, which are reconstructed by the reconstruction unit, onto a line in the depth direction of the projection plane (Step 1104).

The information processing apparatus 1001 in FIG. 10 may reduce the amount of coordinate data on the line segments representing the object existing range in the images taken by the reference imaging devices.

The base imaging device having the projection center and the projection plane corresponds to the base camera, the plurality of reference imaging devices for taking the plurality of reference images correspond to the plurality of reference cameras.

Figure 12:
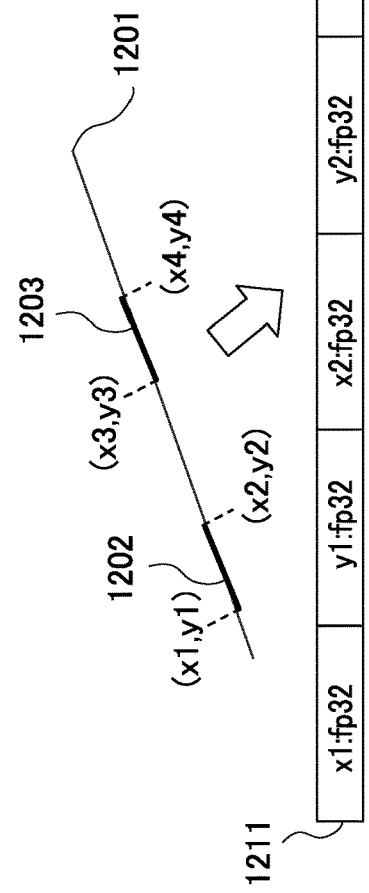
FIG. 12 is a view illustrating line segment end coordinates in conventional line segment search processing.

FIG. 12 illustrates an example of line-segment end coordinate values in conventional line-segment search processing. Among four endpoints including two endpoints of a line segment 1202 and two endpoints of a line segment 1203 on an epipolar line 1201, coordinate values of the $n^{th}$ (n=1 to 4) endpoint are described as (xn, yn). xn is a horizontal coordinate value of the reference image, and yn is a vertical coordinate value of the reference image. xn and yn each are expressed as 32 bits of floating-point type variable fp32, and are stored in a storage unit 1211. Accordingly, the data amount of the line-segment end coordinate values of the four endpoints is 256 bits.

Figure 13:
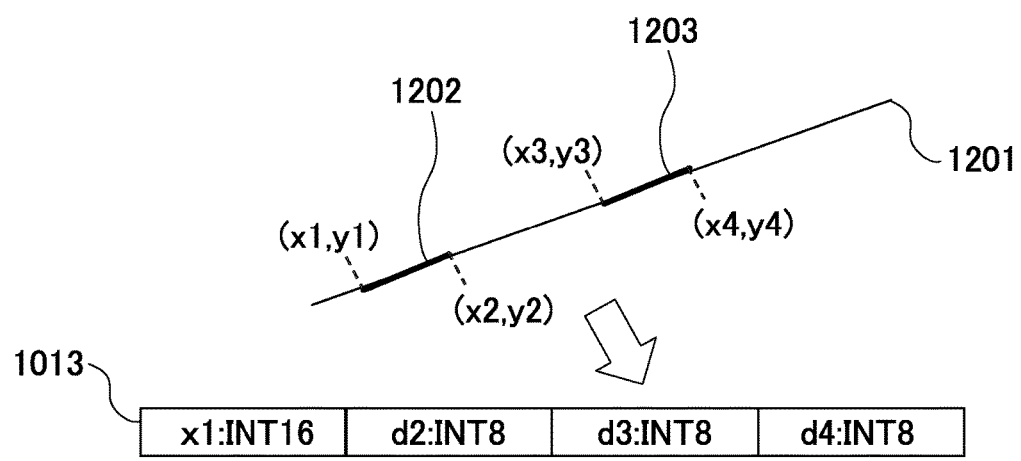
FIG. 13 is a view illustrating line segment end coordinates of line segment search processing according to the embodiment.

FIG. 13 illustrates an example of line-segment end coordinate values of the line-segment search processing according to the embodiment. In this example, out of an x-coordinate value and a y-coordinate value of each endpoint on the epipolar line 1201, only the x-coordinate value is stored in the storage unit 1013. When the overlap determination processing is executed, the y-coordinate value is calculated from the x-coordinate value stored in the storage unit 1013 by using an equation of the epipolar line 1201.

Further, x-coordinate values except for X1 in x1 to x4 each are transformed into a difference dn (n=2 to 4) between the x-coordinate value and an x-coordinate value of another endpoint that exists at the lower left on the epipolar line 1201. The difference dn is calculated by a following equation.

$$dn = xn - x(n-1) \quad (3)$$

x1 is expressed as 16 bits of integer variable INT16, and d2 to d4 each are expressed as 8 bits of integer variable INT8, and are stored in the storage unit 1013. Accordingly, the data amount of the line-segment end coordinate values of the four endpoints is 40 bits, which is significantly smaller than the amount of data of the line-segment end coordinate values in FIG. 12.

As described above, out of the x-coordinate value and the y-coordinate value of each endpoint, only one coordinate value is stored in the storage unit 1013 to cut the data amount of the line-segment end coordinate values by half. Further, the line-segment end coordinate values are transformed into the difference between the line-segment end coordinate value and a coordinate value of another endpoint to reduce an amount of the line-segment end coordinate values, thereby further compressing the data amount of the line-segment end coordinate values. This may reduce a storage area of the storage unit 1013 for storing the line-segment end coordinate values as well as an amount of memory access to the storage unit 1013.

Figure 14A:
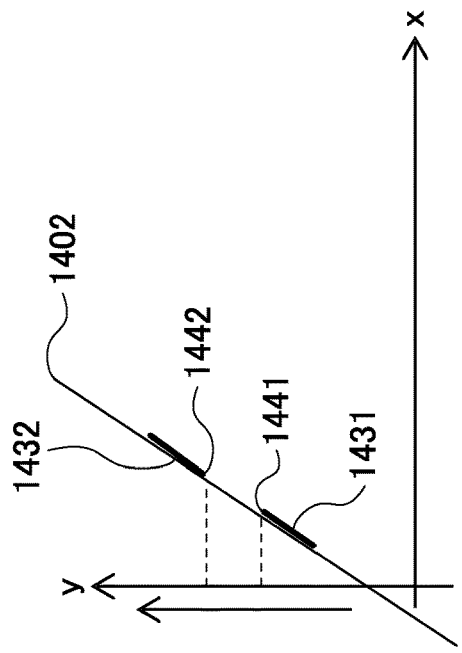
FIGS. 14A and 14B are views illustrating a method of selecting the line segment end coordinates.
Figure 14B:
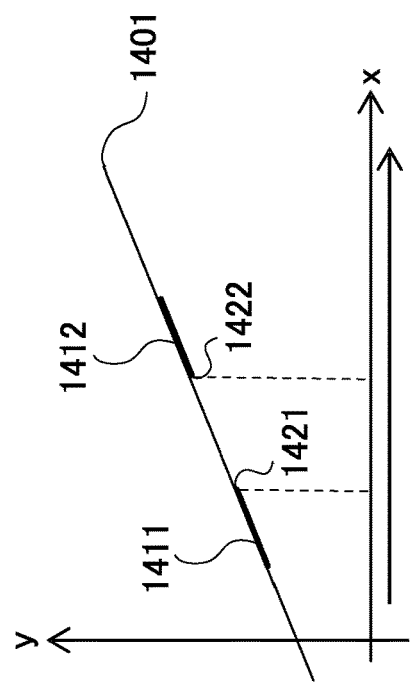

FIGS. 14A and 14B illustrate an example of a method of selecting the line-segment end coordinate values stored in the storage unit 1013. In the case where points in the reference image are described in an xy-coordinate system, an equation of the epipolar line is a following equation.

$$y = a*x + b \quad (4)$$

In the equation (4), a denotes an inclination of the epipolar line, and b denotes the y-coordinate of the intersection of the epipolar line and the y-axis.

In the line-segment search processing, endpoints of the line segment that represents the silhouette are searched while moving the search point on the epipolar line. Thus, out of the x-coordinate and the y-coordinate, for example, a coordinate having a larger difference (moving amount) between coordinate values of two endpoints on the epipolar line may be selected as a coordinate (base coordinate) whose coordinate values are to be stored in the storage unit 1013. Coordinate values based on the base coordinate are stored in the storage unit 1013 by using the integer variable. Which one of the two coordinates has a larger moving amount may be determined based on the value of the inclination of the epipolar line.

Given that the base coordinate is a c-coordinate (c=x or y), cn that is the c-coordinate of the $n^{th}$ (n>1) endpoint searched on the epipolar line is transformed into the difference dn between cn and c(n−1) that is the c-coordinate of n−1th endpoint, and the transformed difference dn is stored in the storage unit 1013. However, c1 that is the first c-coordinate is stored in the storage unit 1013 as it is.

In the overlap determination processing, cn may be reconstructed using the reconstructed c(n−1) and dn stored in the storage unit 1013, and coordinate values based on the other coordinate (y or x) other than the c-coordinate may be calculated by the equation (4). In this case, the coordinate values thus calculated based on the other coordinate are expressed as the floating-point type variable.

FIG. 14A illustrates an example of an epipolar line in the case of 0<a<1. In this case, the inclination a of the epipolar line 1401 falls within the range of 0<a<1, the coordinate having a larger moving amount is the x-coordinate, and a x-coordinate value of each of the searched endpoints is transformed into a coordinate difference. In the case where the x-coordinate value of an endpoint 1421 of a line segment 1411 is x(n−1), and the x-coordinate value of an endpoint 1422 of a line segment 1412 is xn, xn is transformed into the difference dn by the equation (3).

FIG. 14B illustrates an example of the epipolar line in the case of 1<a. In this case, since the inclination a of an epipolar line 1402 is larger than 1, the coordinate having a larger moving amount is the y-coordinate, and the y-coordinate value of each of the searched endpoints is transformed into the coordinate difference. In the case where the y-coordinate value of an endpoint 1441 of a line segment 1431 is y(n−1), and the y-coordinate value of an endpoint 1442 of a line segment 1432 is yn, yn is transformed into the difference dn by a following equation.

$$dn = yn - y(n-1) \quad (5)$$

An interval (increment value) of the base coordinate at movement of the search point on the epipolar line is not necessarily 1, and may be changed to a value less than 1 so as to satisfy a desired accuracy. In this case, a predetermined resolution may be set to z-coordinate that represents the object existing range on the z-axis in FIG. 5, and the set resolution may be used as the desired accuracy.

For example, when the resolution is satisfied by incrementing the base coordinate by 1, an integer value of the base coordinate is stored in the storage unit 1013 as it is. When the resolution is satisfied by incrementing the base coordinate by 0.5, an integer value that is twice of the integer value of the base coordinate is stored in the storage unit 1013. When the resolution is satisfied by incrementing the base coordinate by 0.25, an integer value that is four times of the integer value of the base coordinate is stored in the storage unit 1013.

By selecting the coordinate having a larger moving amount as the base coordinate, and storing a coordinate value based on the selected base coordinate as the integer value in the storage unit 1013, when coordinate values based on the other coordinate are reconstructed by the equation (4), a decimal whose increment value is less than the moving amount of the base coordinate may be used to represent the coordinate values based on the other coordinate. Accordingly, in the case where the increment value of the base coordinate satisfies the desired accuracy, the reconstructed coordinate values based on the other coordinate also reliably satisfy the desired accuracy.

However, in the case where adjusting the increment value of a coordinate having a smaller moving amount allows the other coordinate to satisfy the desired accuracy, the coordinate having the smaller moving amount may be selected as the base coordinate.

The line-segment search processing is executed by setting a search start point and a search end point on the epipolar line, and moving the search point from the search start point to the search end point by a predetermined increment. For example, the search start point is set to a position that is nearer to the epipole than the search end point is.

In this case, since the moving direction of the search point on the epipolar line is limited to one direction, the sign of the difference dn is uniform. Thus, an absolute value of the difference dn may be stored in the storage unit 1013, and in reconstructing coordinate values based on the base coordinate, a sign of the difference dn may be determined so as to match the sign of the coordinates (xn, yn) of the actual endpoint.

The floating point number includes cardinal number and mantissa, and the accuracy of decimals varies depending on a value of the floating number. For this reason, in the case where a coordinate value based on the base coordinate is represented by the floating point number, the accuracy of representing decimals is improved by generating the difference between two coordinate values, but the objective to reduce the data amount is not necessarily satisfied. That is, omitting decimals does not enable change in the format of the floating-point type variable. In contrast, if the base coordinate uses an integer as a coordinate value, generating a difference between two coordinate values allows a value range for representing line segments to be reduced, thereby reducing the bit width of the integer variable.

A bit width of the integer variable, which expresses each of a first base-coordinate value c1 and the difference dn based on the base coordinate, is determined based on the base-coordinate value c1 or the integer value of the difference dn. For example, a minimum bit width that may store the base-coordinate value c1 or the integer value of the difference dn may be set as the bit width of the integer variable. The storage area of the storage unit 1013 may be minimized by determining the bit width of the integer values stored in the integer variable in this manner.

For example, in the case where the base-coordinate values of a plurality of endpoints searched on the epipolar line are stored as INT16 or INT8, whether each integer variable is INT16 or INT8 may be distinguished based on the first bit (format bit). When the integer variable is INT16, the first bit may be set at "1", and when the integer variable is INT8, the first bit may be set at "0". When two endpoints are away from each other and the absolute value of the difference dn is large, INT16 is used, and when two endpoints are close to each other and the absolute value of the difference dn is small, INT8 is used.

FIG. 15 illustrates an example of a method of determining the sign of the difference dn. The sign of the difference dn may be determined from the positional relation between the search start point and the search end point. In the case where the search point moves from the search start point to the search end point such that the coordinate value becomes larger (positive direction), the sign is "+", and in the case where the search point moves from the search start point to the search end point such that the coordinate value becomes smaller (negative direction), the sign is "−".

In the overlap determination processing, the sign determined according to the method in FIG. 15 may be added to the absolute value of dn read from the storage unit 1013 to reconstruct dn, and dn may be added to reconstructed c(n−1) to reconstruct cn.

Figure 16:
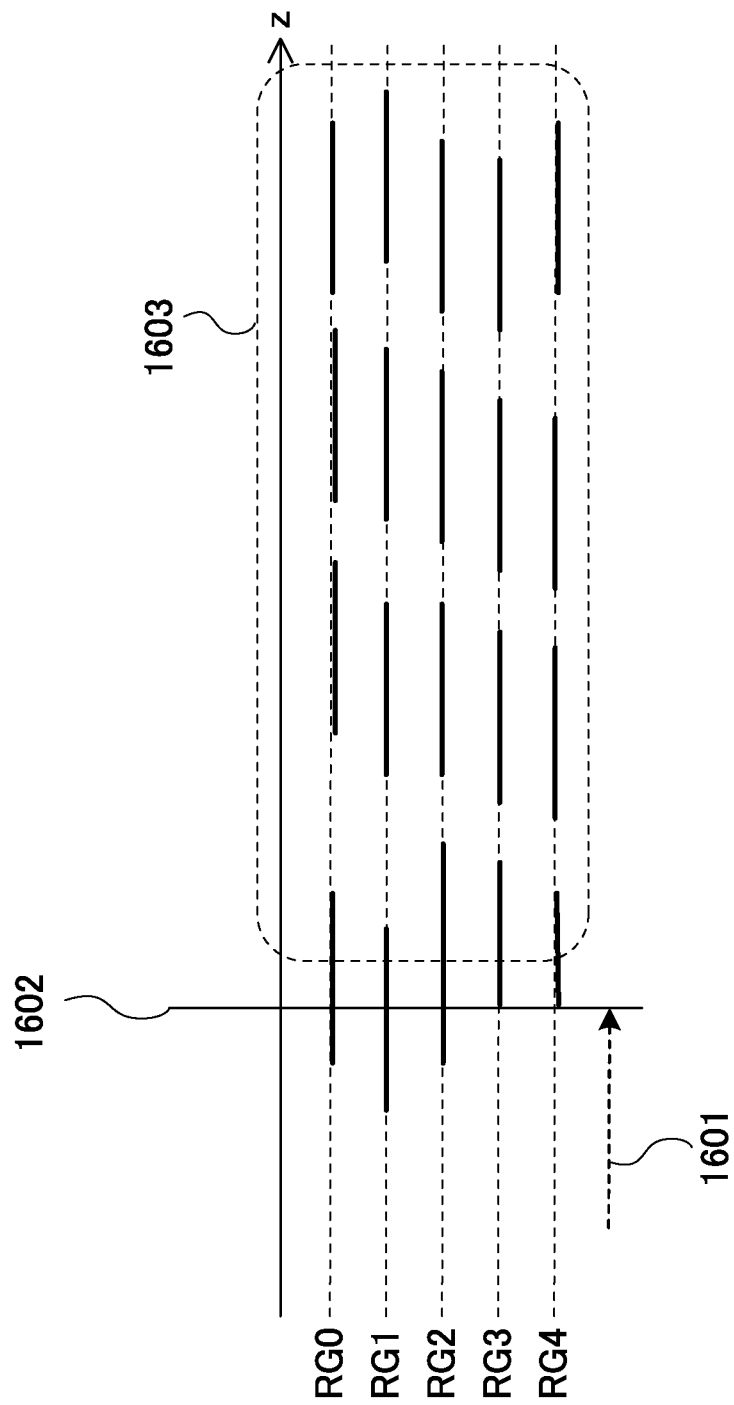
FIG. 16 is a view of overlap determination processing in the case where a plurality of line segments are searched from each reference image.

FIG. 16 illustrates an example of the overlap determination processing in the case where a plurality of line segments are searched from each of the reference images RG0 to RG4. When the front surface of an object is searched on the z-axis in the direction of an arrow 1601, and the number of overlapping line-segments among the reference images RG0 to RG4 at a position 1602 on the z-axis becomes a threshold value or more, the overlap determination processing may be finished. In this case, z-coordinate values of endpoints of line segments within a range 1603 surrounded with a broken line are unnecessary.

Since the operation amount of the difference operation of generating the difference dn based on the base coordinate is smaller than the operation amount of coordinate transformation, the operational efficiency is higher when the difference dn is stored in the storage unit 1013 than when the z-coordinate value is stored in the storage unit 1013.

Figure 17:
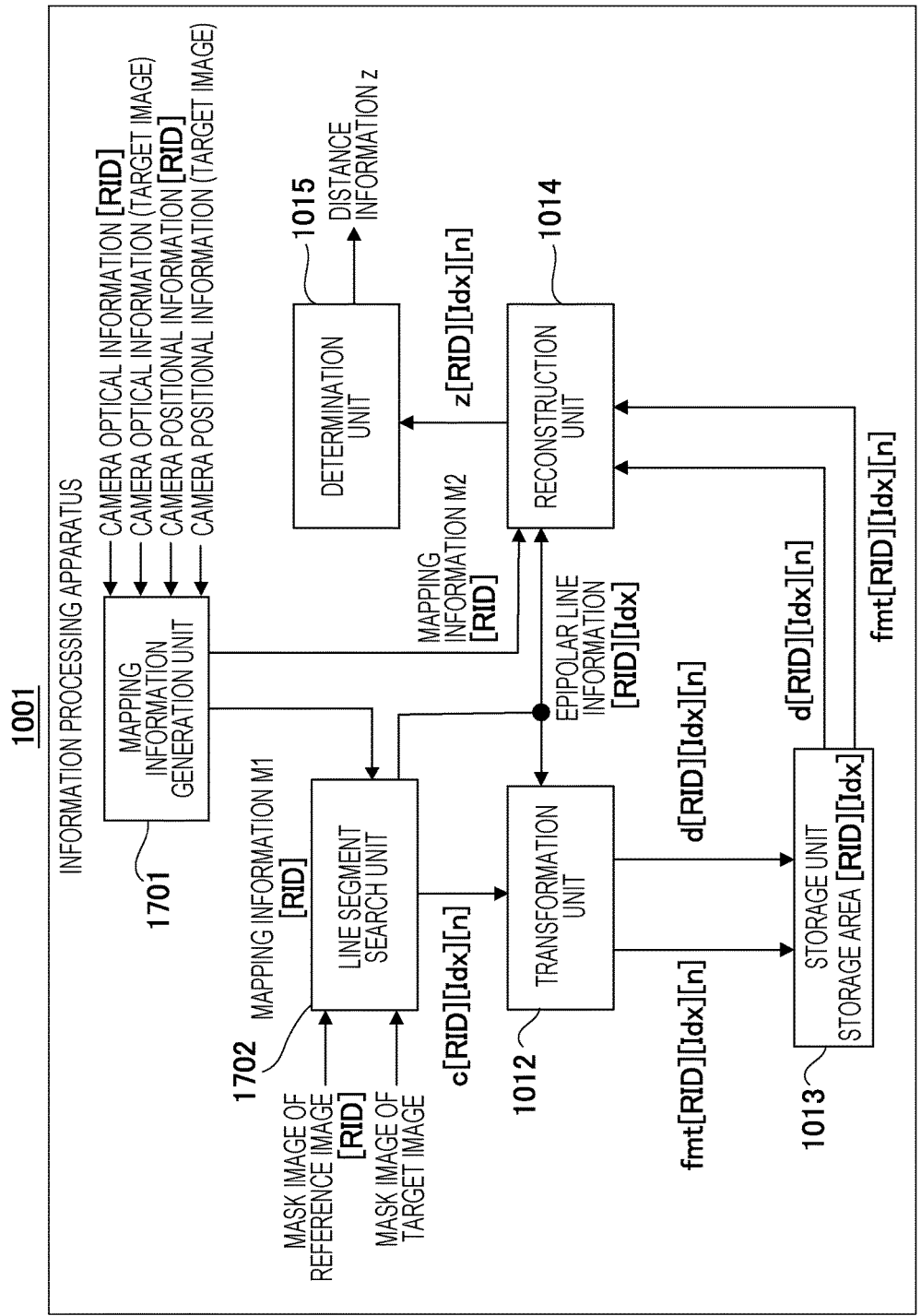
FIG. 17 is a functional configuration view illustrating a specific example of an information processing apparatus.

FIG. 17 illustrates an example of the information processing apparatus 1001 in FIG. 10. The information processing apparatus 1001 in FIG. 17 includes the transformation unit 1012, the storage unit 1013, the reconstruction unit 1014, the determination unit 1015, a mapping information generation unit 1701, and a line segment search unit 1702, and executes the VisualHull processing of reconstructing the three dimensional shape of the object from a multi-viewpoint video. The mapping information generation unit 1701 and the line segment search unit 1702 correspond to the generation unit 1011 in FIG. 1.

In the VisualHull processing executed by the information processing apparatus 1001 in FIG. 17, following parameters are used.

RID: Identification information for identifying the reference image taken by the reference camera Idx: Identification information for identifying the epipolar line in the reference image n: Identification information for identifying endpoints of the line segment searched on the epipolar line mask image of reference image[RID]: mask image generated from the reference image identified by RID mask image of target image: mask image generated from the target image taken by the base camera camera optical information[RID]: optical information of the reference camera that takes the reference image identified by RID camera optical information (target image): optical information of the base camera camera positional information[RID]: positional information of the reference camera that takes the reference image identified by RID camera positional information (target image): positional information of the base camera mapping information M1[RID]: transformation matrix of coordinate transformation for mapping a point in the three dimensional space onto the reference image identified by RID mapping information M2[RID]: transformation matrix of coordinate transformation for mapping a point in the reference image identified by RID onto the straight line (z axis) in the depth direction of the target image epipolar line information[RID][Idx]: parameter (a, b) indicating the equation of the epipolar line identified by Idx in the reference image identified by RID c[RID][Idx][n]: in the reference image identified by RID, base-coordinate value (c is X or Y) of the $n^{th}$ endpoint searched on the epipolar line identified by Idx d[RID][Idx][n]: in the reference image identified by RID, the base-coordinate value of the $n^{th}$ endpoint searched on the epipolar line identified by Idx, or the integer value indicating the absolute value of the difference of the base-coordinate values of the endpoint fmt[RID][Idx][n]: in the reference image identified by RID, bit value of the format bit, which indicates the bit width of the integer variable of the $n^{th}$ endpoint searched on the epipolar line identified by Idx storage area[RID][Idx]: in the reference image identified by RID, storage area that stores the integer value and the format bit of the endpoint searched on the epipolar line identified by Idx z[RID][Idx][n]: in the reference image identified by RID, z-coordinate acquired by mapping the $n^{th}$ endpoint searched on the epipolar line identified by Idx onto the z-axis of the target image distance information z: z-coordinate of the front surface or the back surface of the object determined in the overlap determination processing Idx may be used as identification information for identifying the epipolar line in the reference image, as well as identification information for identifying a pixel in the object region in the mask image of the target image.

The mapping information generation unit 1701 uses the camera optical information[RID], the camera optical information (target image), the camera positional information [RID], and the camera positional information (target image), to generate the mapping information M1[RID] and the mapping information M2[RID].

The line segment search unit 1702 uses the mask image of reference image[RID], the mask image of the target image, and the mapping information M1[RID] to generate the epipolar line information[RID][Idx], and executes the line segment search processing to find c[RID][Idx][n].

The transformation unit 1012 transforms c[RID][Idx][n] into d[RID][Idx][n] and fmt[RID][Idx][n], and stores them in the storage area[RID][Idx] of the storage unit 1013. At this time, the transformation unit 1012 determines the bit width of the integer variable that stores d[RID][Idx][n], based on the value of d[RID][Idx][n]. For example, the minimum bit width for storing d[RID][Idx][n] is determined as the bit width of the integer variable.

The reconstruction unit 1014 reads fmt[RID][Idx][n] and d[RID][Idx][n] of the bit width indicated by fmt[RID][Idx][n] from the storage area[RID][Idx] of the storage unit 1013. Then, the reconstruction unit 1014 reconstructs c[RID][Idx][n] from d[RID][Idx][n], and uses the epipolar line information[RID][Idx] and the mapping information M2[RID] to find z[RID][Idx][n] from c[RID][Idx][n].

The determination unit 1015 uses z[RID][Idx][n] to execute the overlap determination processing, and outputs the distance information z.

Figure 18:
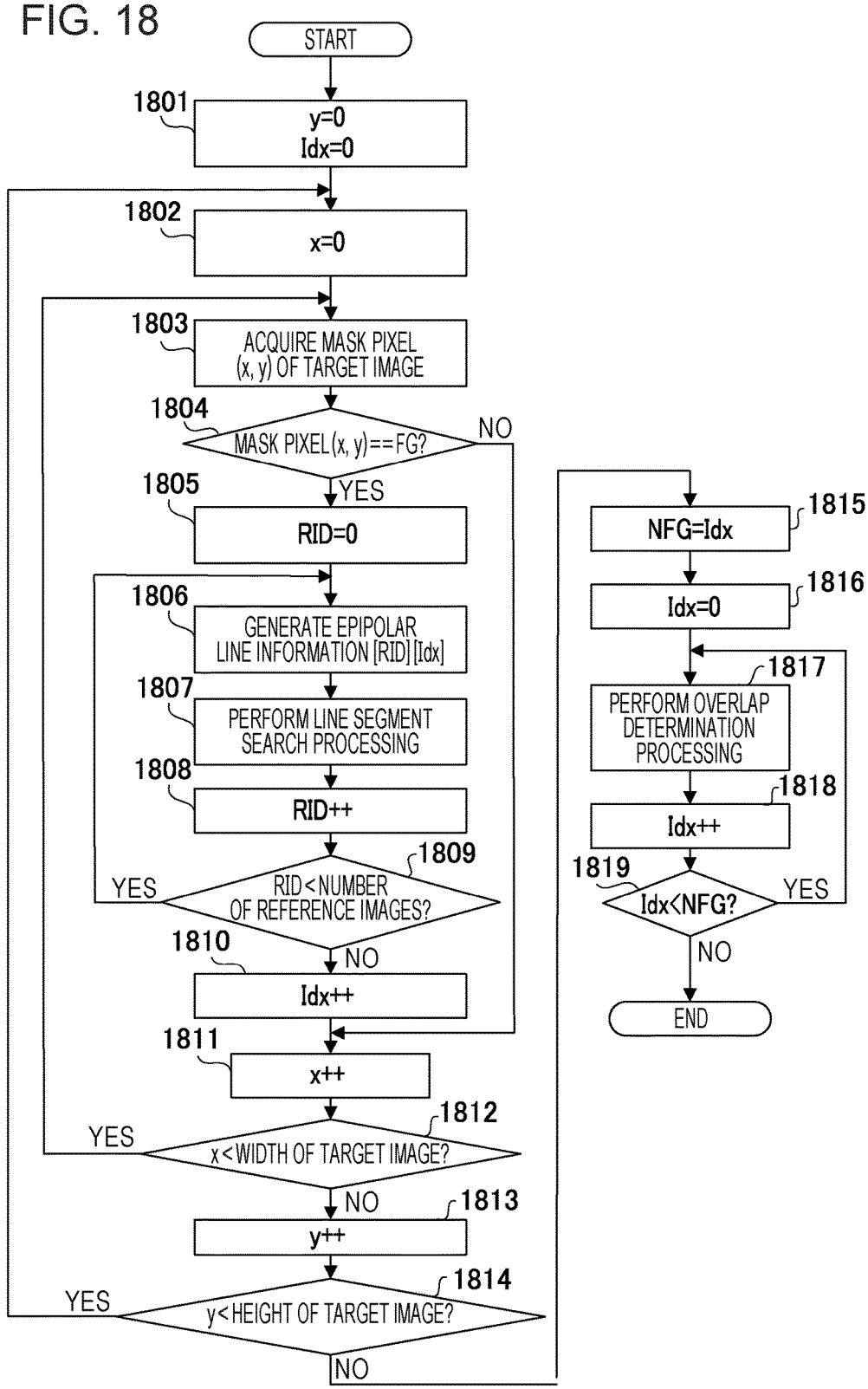
FIG. 18 is a flow chart of VisualHull processing.

FIG. 18 is a flowchart illustrating an example of the VisualHull processing executed by the information processing apparatus 1001 in FIG. 17. The VisualHull processing is applied to the multi-viewpoint images at one time, and in the case of the multi-viewpoint video, the VisualHull processing in FIG. 18 is repeatedly applied to the multi-viewpoint images at each time. (x, y) represents coordinate values of a processing target pixel (mask pixel) in the mask image of the target image.

First, the line segment search unit 1702 sets an initial value 0 to y and Idx (Step 1801), and sets an initial value 0 to x (Step 1802). Then, the line segment search unit 1702 acquires the pixel value of the mask pixel (x, y) from the mask image of the target image (Step 1803), and checks whether or not the pixel value of the mask pixel (x, y) is a pixel value FG indicating the object region (Step 1804).

When the pixel value of the mask pixel (x, y) is not FG (Step 1804, NO), the line segment search unit 1702 increments x by 1 (Step 1811), and compares x with the width of the target image (Step 1812). When x is smaller than the width of the target image (Step 1812, YES), the line segment search unit 1702 repeats the processing in Step 1803 and subsequent steps.

On the contrary, when the pixel value of the mask pixel (x, y) is FG (Step 1804, YES), the line segment search unit 1702 sets an initial value 0 to RID (Step 1805). Then, the line segment search unit 1702 uses the mapping information M1[RID] to map a straight line that passes the viewpoint of the base camera and the mask pixel (x, y) onto the mask image of reference image[RID], thereby generating the epipolar line information[RID][Idx] (Step 1806).

Next, the line segment search unit 1702 executes the line-segment search processing on the epipolar line indicated by the epipolar line information[RID][Idx] (Step 1807). Then, the line segment search unit 1702 increments RID by 1 (Step 1808), and compares RID with the number of reference images (Step 1809). When RID is smaller than the number of reference images (Step 1809, YES), the line segment search unit 1702 repeats the processing in Step 1806 and subsequent steps.

Then, when RID reaches the number of reference images (Step 1809, NO), the line segment search unit 1702 increments Idx by 1 (Step 1810), and executes processing in Step 1811 and subsequent steps.

When x reaches the width of the target image (Step 1812, NO), the line segment search unit 1702 increments y by 1 (Step 1813), and compares x with the height of the target image (Step 1814). When y is smaller than the height of the target image (Step 1814, YES), the line segment search unit 1702 repeats the processing in Step 1802 and subsequent steps.

When y reaches the height of the target image (Step 1814, NO), the determination unit 1015 sets Idx to a variable NFG indicating the number of pixels of the object region in the mask image of the target image (Step 1815). Then, the determination unit 1015 sets an initial value 0 to Idx (Step 1816), and executes the overlap determination processing of the pixel of the object region, which is indicated by Idx in the mask image of the target image (Step 1817).

Next, the determination unit 1015 increments Idx by 1 (Step 1818), and compares Idx with NFG (Step 1819). when Idx is smaller than NFG (Step 1819, YES), the determination unit 1015 repeats the processing in Step 1817 and subsequent steps. Then, when Idx reaches NFG (Step 1819, NO), the determination unit 1015 finishes its processing.

Figure 19:
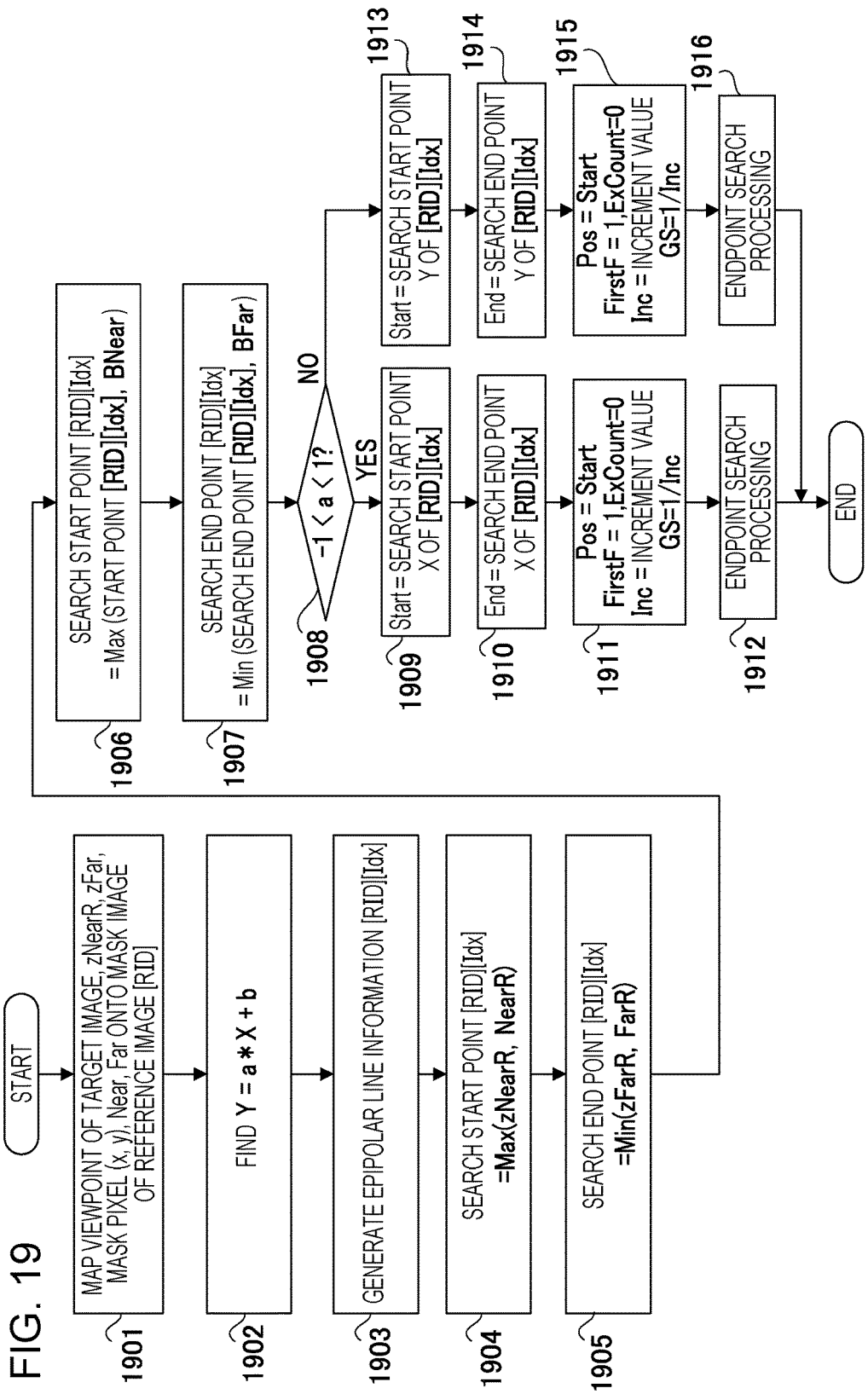
FIG. 19 is a flow chart of epipolar line information generation processing and line segment search processing.

FIG. 19 is a flowchart illustrating an example of the epipolar line information generation processing in Step 1806 and the line segment search processing in Step 1807 in FIG. 18. In the processing in FIG. 19, following parameters are used.

search start point[RID][Idx]: in the reference image identified by RID, the search start point on the epipolar line identified by Idx search end point[RID][Idx]: in the reference image identified by RID, the search end point on the epipolar line identified by Idx (X, Y): coordinate values of the pixel in the mask image of reference image[RID]

First, the line segment search unit 1702 uses the mapping information M1[RID] to map the viewpoint of the base camera, the mask pixel (x, y), and following points P1 to P4 onto the mask image of reference image[RID] (Step 1901).

zNear: the nearest point to the viewpoint of the base camera in the range in which the object physically exists on a straight line L that passes the viewpoint of the base camera and the mask pixel (x, y)

zFar: the farthest point from the viewpoint of the base camera in the range in which the object physically exists on the straight line L Near: the search start point set on the straight line L by the user according to the objective of the VisualHull processing Far: the search end point set on the straight line L by the user according to the objective of the VisualHull processing When aligned in the order from the nearest position to the viewpoint of the base camera on the straight line L, the four points are zNear, Near, Far, and zFar. As described below, these points are mapped onto zNearR, zFarR, NearR, and FarR in the mask image of reference image[RID].

zNear→zNearR
zFar→zFarR
Near→NearR
Far→FarR

The viewpoint of the base camera and the mask pixel (x, y) are mapped onto the point P1 and the point P2 in the mask image of reference image[RID], respectively. The point P1 among the points is the epipole.

Next, the line segment search unit 1702 obtains the equation: Y=a*X+b of the epipolar line that passes the point P1 and the point P2 in the mask image of reference image [RID] (Step 1902). Then, the line segment search unit 1702 generates the epipolar line information[RID][Idx] including the parameter (a, b) indicating the obtained equation (Step 1903).

Next, the line segment search unit 1702 sets Max (zNearR, NearR) to the search start point[RID][Idx] (Step 1904). Max (P, Q) denotes the further point from the epipole P1 among the points P and Q.

Next, the line segment search unit 1702 sets Min (zFarR, FarR) to the search end point[RID][Idx] (Step 1905). Min (P, Q) denotes the nearer point to the epipole P1 out of the points P and Q.

Next, the line segment search unit 1702 sets Max (search start point[RID][Idx], BNear) to the search start point[RID][Idx] (Step 1906). BNear is the nearer point to the epipole P1 out of two intersections of the epipolar line and the window edge of the mask image of reference image[RID].

Next, the line segment search unit 1702 sets Min (search end point[RID][Idx], BFar) to the search end point[RID][Idx] (Step 1907). BFar is the further point from the epipole P1 out of the two intersections of the epipolar line and the window edge of the mask image of reference image[RID].

Next, the line segment search unit 1702 checks the inclination a of the epipolar line (Step 1908). When a is larger than −1 and smaller than 1 (Step 1908, YES), the line segment search unit 1702 sets the X-coordinate value of the search start point[RID][Idx] to a variable Start (Step 1909). Then, the line segment search unit 1702 sets the X-coordinate value of the search end point[RID][Idx] to a variable End (Step 1910).

Next, the line segment search unit 1702 sets following values to a variable Pos, a variable FirstF, a variable ExCount, a variable Inc, and a variable GS, respectively (Step 1911).

Pos=Start
FirstF=1
ExCount=0
Inc=increment value of base coordinate
GS=1/Inc

Then, the line segment search unit 1702 executes endpoint search processing by using the X-coordinate as the base coordinate (Step 1912).

On the contrary, when a is equal to or smaller than −1 or is equal to or larger than 1 (Step 1908, NO), the line segment search unit 1702 sets the Y-coordinate value of the search start point[RID][Idx] to the variable Start (Step 1913). Then, the line segment search unit 1702 sets the Y-coordinate value of the search end point[RID][Idx] to the variable End (Step 1914).

Next, the line segment search unit 1702 sets the same values as the values in Step 1911 to the variable Pos, the variable FirstF, the variable ExCount, the variable Inc, and the variable GS, respectively (Step 1915). Then, the line segment search unit 1702 executes the endpoint search processing by using the Y-coordinate as the base coordinate (Step 1916).

Figure 20:
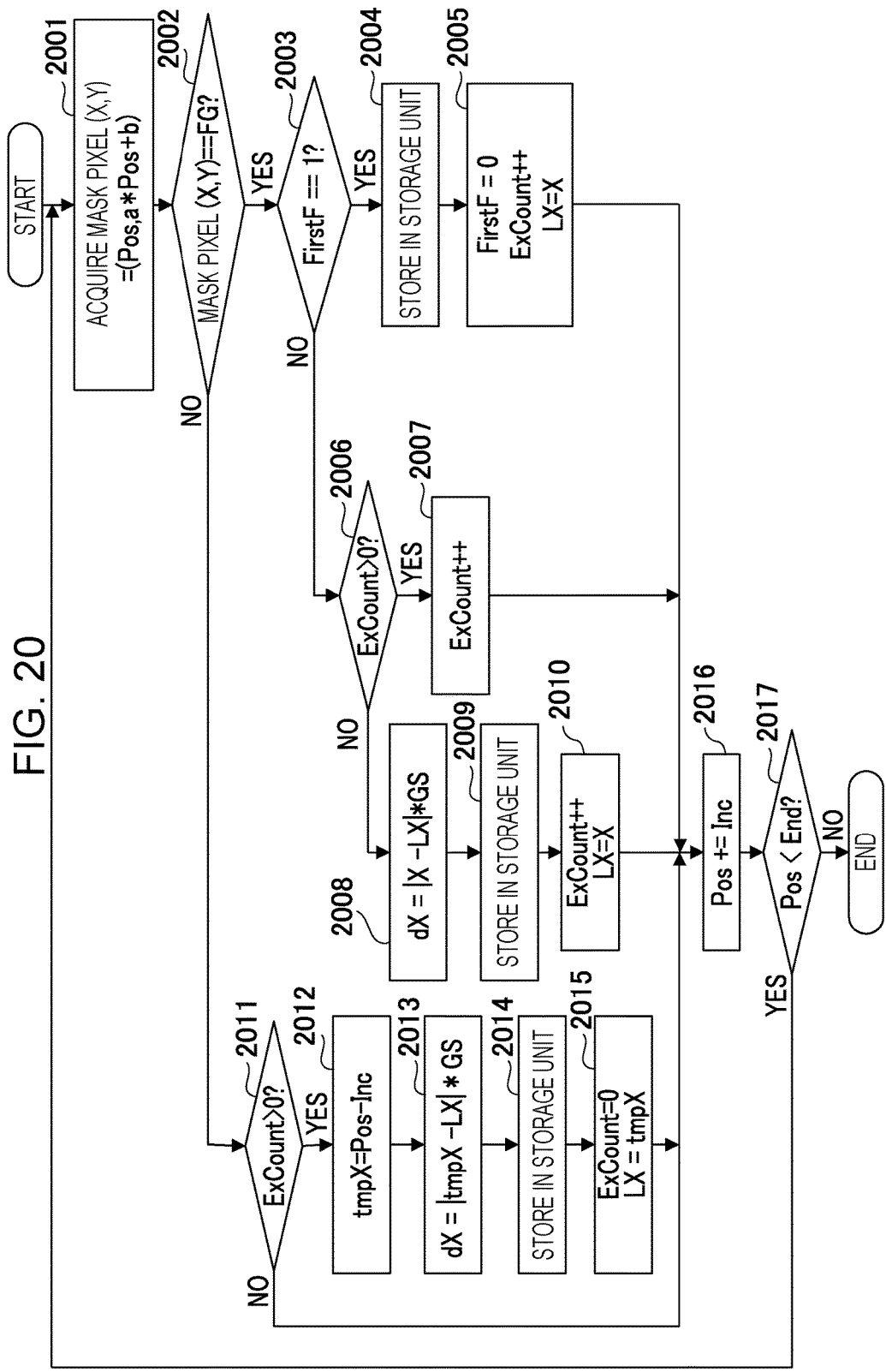
FIG. 20 is a flow chart of endpoint search processing using an X coordinate as a base coordinate.

FIG. 20 is a flowchart illustrating an example of the endpoint search processing in Step 1912 in FIG. 19. First, the line segment search unit 1702 acquires the mask pixel (X, Y)=(Pos, a*Pos+b) from the mask image of reference image[RID] (Step 2001). Then, the line segment search unit 1702 checks whether or not the pixel value of the acquired mask pixel (X, Y) is the pixel value FG indicating the object region (Step 2002).

When the pixel value of the mask pixel (X, Y) is not FG (Step 2002, NO), the line segment search unit 1702 compares ExCount with 0 (Step 2011). When ExCount is 0 (Step 2011, NO), the line segment search unit 1702 sets Pos+Inc to Pos (Step 2016), and compares Pos with End (Step 2017). When Pos is smaller than End (Step 2017, YES), the line segment search unit 1702 repeats the processing in Step 2001 and subsequent steps.

When the pixel value of the mask pixel (X, Y) is FG (Step 2002, YES), the line segment search unit 1702 compares FirstF with 1 (Step 2003). When FirstF is 1 (Step 2003, YES), the line segment search unit 1702 outputs the X-coordinate value of the mask pixel (X, Y) to the transformation unit 1012 (Step 2004). Then, the transformation unit 1012 multiplies the X-coordinate value by GS to put the X-coordinate value into the integer value, and uses the integer variable having the minimum bit width for storing the acquired integer value d to store the integer value d and the format bit in the storage area[RID][Idx] of the storage unit 1013.

The integer value d stored in the storage unit 1013 in Step 2004 corresponds to the X-coordinate value of the nearer endpoint to the search start point out of two endpoints of the line segment first found on the epipolar line.

Next, the line segment search unit 1702 sets 0 to FirstF, increments ExCount by 1, sets the X-coordinate of the mask pixel (X, Y) to a variable LX (Step 2005), and executes processing in Step 2016 and subsequent steps.

When FirstF is 0 (Step 2003, NO), the line segment search unit 1702 compares ExCount with 0 (Step 2006). When ExCount is larger than 0 (Step 2006, YES), the line segment search unit 1702 increments ExCount by 1 (Step 2007), and executes processing in Step 2016 and subsequent steps.

On the contrary, when ExCount is 0 (Step 2006, NO), the line segment search unit 1702 outputs the X-coordinate value of the mask pixel (X, Y) to the transformation unit 1012 (Step 2008). Then, the transformation unit 1012 transforms the X-coordinate value into an integer value of difference dX by a following equation.

$$dX=|X-LX|*GS \quad (11)$$

The transformation unit 1012 uses the integer variable having the minimum bit width for storing the integer value d=dX to store the integer value d and the format bit in the storage area[RID][Idx] of the storage unit 1013 (Step 2009).

The integer value d stored in the storage unit 1013 in Step 2009 corresponds to the X-coordinate value of the nearer endpoint to the search start point out of two endpoints of the second or subsequently found line segment on the epipolar line.

Next, the line segment search unit 1702 increments ExCount by 1, sets the X-coordinate value of the mask pixel (X, Y) to LX (Step 2010), and executes processing in Step 2016 and subsequent steps.

In Step 2011, when ExCount is larger than 0 (Step 2011, YES), the line segment search unit 1702 sets Pos-Inc to a variable tmpX (Step 2012), and outputs tmpX to the transformation unit 1012 (Step 2013). Then, the transformation unit 1012 transforms tmpX into an integer value of difference dX by a following equation.

$$dX=|tmpX-LX|*GS \tag{12}$$

The transformation unit 1012 uses the integer variable having the minimum bit width for storing the integer value d=dX to store the integer value d and the format bit in the storage area[RID][Idx] of the storage unit 1013 (Step 2014).

The integer value d stored in the storage unit 1013 in Step 2014 corresponds to the X-coordinate vale of the nearer endpoint to the search end point out of two endpoints of the line segment first found on the epipolar line.

Figure 21:
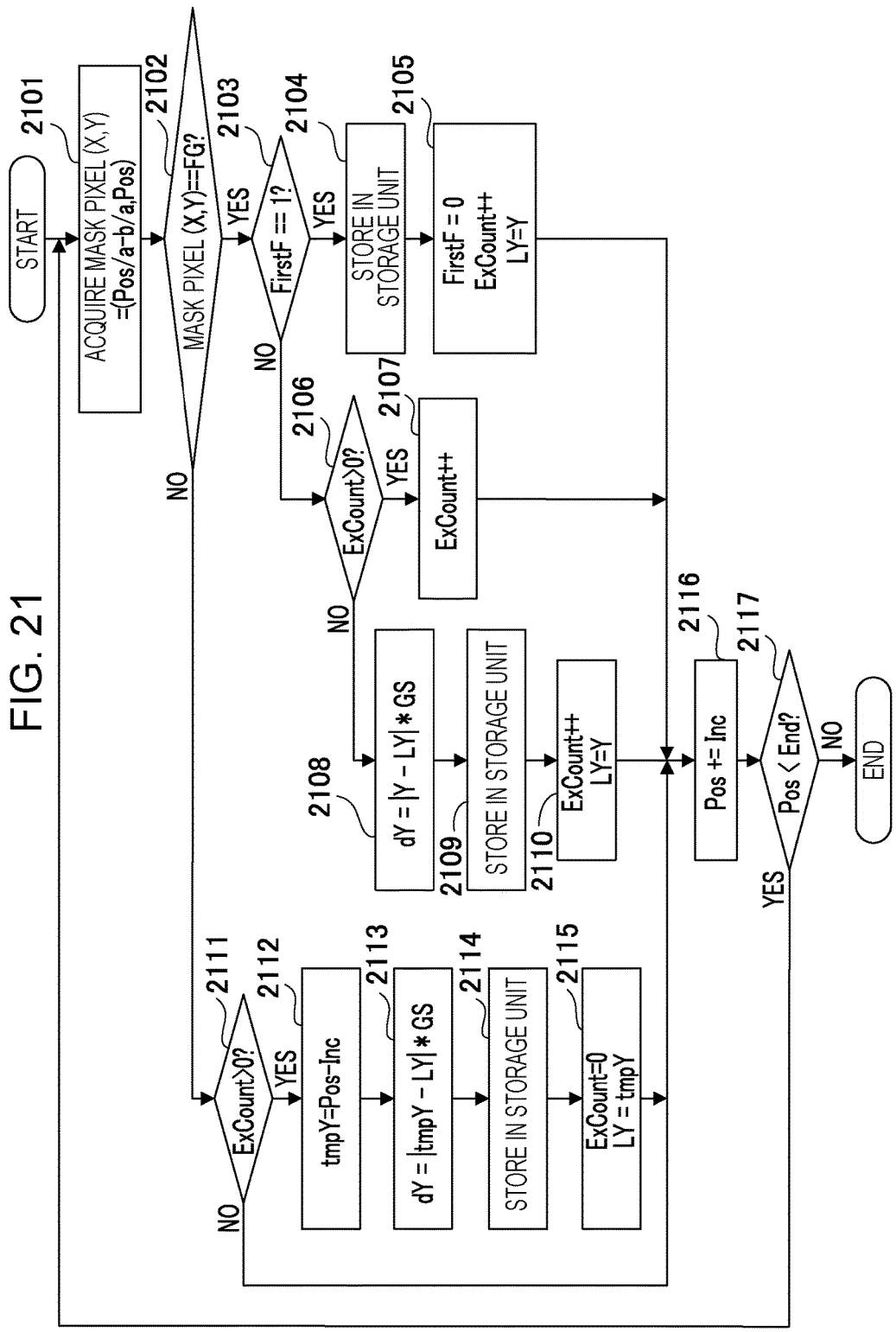
FIG. 21 is a flow chart of endpoint search processing using a Y coordinate as the base coordinate.

Next, the line segment search unit 1702 sets 0 to ExCount, and sets tmpX to LX (Step 2015), and executes processing in Step 2016 and subsequent steps. FIG. 21 is a flowchart illustrating an example of the endpoint search processing in Step 1916 in FIG. 19. First, the line segment search unit 1702 acquires the mask pixel (X, Y)=(Pos/a-b/a, Pos) from the mask image of reference image[RID] (Step 2101). Then, the line segment search unit 1702 checks whether or not the pixel value of the acquired mask pixel (X, Y) is the pixel value FG indicating the object region (Step 2102).

When the pixel value of the mask pixel (X, Y) is not FG (Step 2102, NO), the line segment search unit 1702 compares ExCount with 0 (Step 2111). When ExCount is 0 (Step 2111, NO), the line segment search unit 1702 sets Pos+Inc to Pos (Step 2116), and compares Pos with End (Step 2117). When Pos is smaller than End (Step 2117, YES), the line segment search unit 1702 repeats the processing in Step 2101 and subsequent steps.

When the pixel value of the mask pixel (X, Y) is FG (Step 2102, YES), the line segment search unit 1702 compares FirstF with 1 (Step 2103). When FirstF is 1 (Step 2103, YES), the line segment search unit 1702 outputs the Y-coordinate vale of the mask pixel (X, Y) to the transformation unit 1012 (Step 2104). Then, the transformation unit 1012 multiplies the Y-coordinate value by GS to put the Y-coordinate value into the integer value, and uses the integer variable having the minimum bit width for storing the acquired integer value d to store the integer value d and the format bit in the storage area[RID][Idx] of the storage unit 1013.

The integer value d stored in the storage unit 1013 in Step 2104 corresponds to the Y-coordinate value of the nearer endpoint to the search start point out of the two endpoints of the line segment first found on the epipolar line.

Next, the line segment search unit 1702 sets 0 to FirstF, increments ExCount by 1, sets the Y-coordinate value of the mask pixel (X, Y) to a variable LY (Step 2105), and executes processing in Step 2016 and subsequent steps.

When FirstF is 0 (Step 2103, NO), the line segment search unit 1702 compares ExCount with 0 (Step 2106). When ExCount is larger than 0 (Step 2106, YES), the line segment search unit 1702 increments ExCount by 1 (Step 2107), and executes processing in Step 2116 and subsequent steps.

On the contrary, when ExCount is 0 (Step 2106, NO), the line segment search unit 1702 outputs the Y-coordinate value of the mask pixel (X, Y) to the transformation unit 1012 (Step 2108). Then, the transformation unit 1012 transforms the Y-coordinate value into a integer value of difference dY by a following equation.

$$dY=|Y-LY|*GS \tag{13}$$

The transformation unit 1012 uses the integer variable having the minimum bit width for storing the integer value d=dY to store the integer value d and the format bit in the storage area[RID][Idx] of the storage unit 1013 (Step 2109).

The integer value d stored in the storage unit 1013 in Step 2109 corresponds to the Y-coordinate value of the nearer endpoint to the search start point out of the two endpoints of the second or subsequently found line segment on the epipolar line.

Next, the line segment search unit 1702 increments ExCount by 1, sets the Y-coordinate value of the mask pixel (X, Y) to LY (Step 2110), and executes processing in Step 2116 and subsequent steps.

When ExCount is larger than 0 in Step 2111 (Step 2111, YES), the line segment search unit 1702 sets Pos-Inc to a variable tmpY (Step 2112), and outputs tmpY to the transformation unit 1012 (Step 2113). Then, the transformation unit 1012 transforms tmpY into an integer value of difference dY by a following equation.

$$dY=|tmpY-LY|*GS \tag{14}$$

The transformation unit 1012 uses the integer variable having the minimum bit width for storing the integer value d=dY to store the integer value d and the format bit in the storage area[RID][Idx] of the storage unit 1013 (Step 2114).

The integer value d stored in the storage unit 1013 in Step 2114 corresponds to the Y-coordinate value of the nearer endpoint to the search end point out of the two endpoints of the line segment first found on the epipolar line.

Next, the line segment search unit 1702 sets 0 to ExCount, and sets tmpY to LY (Step 2115), and executes processing in Step 2116 and subsequent steps.

FIG. 22 is a flowchart illustrating an example of the overlap determination processing in Step 1817 in FIG. 18. In the overlap determination processing, following parameters are used.

base coordinate[RID][Idx]: in the reference image identified by RID, the base coordinate on the epipolar line identified by Idx sign[RID][Idx]: in the reference image identified by RID, sign of the difference based on the base coordinate on the epipolar line identified by Idx First, the reconstruction unit 1014 sets 0 to RID (Step 2201), and acquires (a, b) from the epipolar line information [RID][Idx] (Step 2202). Then, the reconstruction unit 1014 compares the inclination a with −1, and compares the inclination a with 1 (Step 2203).

When a is larger than −1 and smaller than 1 (Step 2203, YES), the reconstruction unit 1014 determines the X-coordinate as the base coordinate[RID][Idx] (Step 2204), and compares the X-coordinate value of zNearR with the X-coordinate value of zFarR (Step 2205).

When the X-coordinate value of zNearR is smaller than the X-coordinate value of zFarR (Step 2205, YES), the reconstruction unit 1014 sets 1 to the sign[RID][Idx] (Step 2206).

On the contrary, when the X-coordinate value of zNearR is equal to or larger than the X-coordinate value of zFarR (Step 2205, NO), the reconstruction unit 1014 sets −1 to the sign[RID][Idx] (Step 2207).

When a is equal to or smaller than −1 or a is equal to or larger than 1 (Step 2203, NO), the reconstruction unit 1014 determines the Y-coordinate as the base coordinate[RID][Idx] (Step 2208), and compares the Y-coordinate value of zNearR with the Y-coordinate value of zFarR (Step 2209).

When the Y-coordinate value of zNearR is smaller than the Y-coordinate value of zFarR (Step 2209, YES), the reconstruction unit 1014 sets 1 to the sign[RID][Idx] (Step 2210). On the contrary, when the Y-coordinate value of zNearR is equal to or larger than the Y-coordinate value of zFarR (Step 2209, NO), the reconstruction unit 1014 sets −1 to the sign[RID][Idx] (Step 2211).

Next, the reconstruction unit 1014 compares RID with the number of reference images (Step 2212). When RID is smaller than the number of reference images (Step 2212, YES), the reconstruction unit 1014 repeats the processing in Step 2202 and subsequent steps. Then, when RID reaches the number of reference images (Step 2212, NO), the reconstruction unit 1014 and the determination unit 1015 executes overlap determination core processing (Step 2213).

Figure 23B:
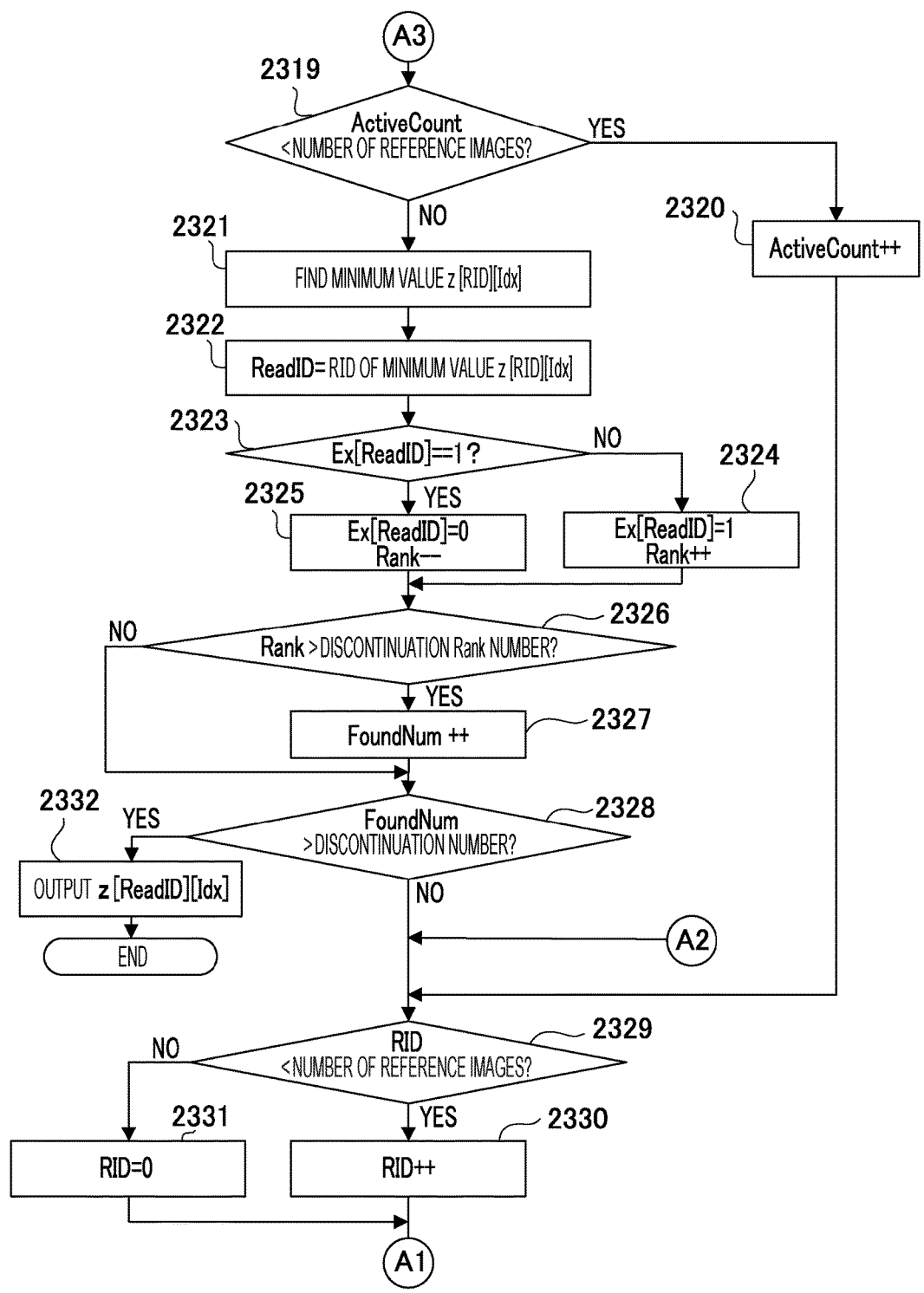
FIG. 23B is a flow chart (2) of the overlap determination core processing.

FIGS. 23A and 23B are flowcharts illustrating an example of the overlap determination core processing in Step 2213 in FIG. 22. In the overlap determination core processing, following parameters are used.

X[RID][Idx]: in the reference image identified by RID, the X-coordinate of the endpoint of the line segment on the epipolar line identified by Idx Y[RID][Idx]: in the reference image identified by RID, the Y-coordinate of the endpoint of the line segment on the epipolar line identified by Idx First, the determination unit 1015 sets following values to RID, variables FirstF[0] to FirstF[the number of reference images−1], a variable ActiveCount, a variable ReadID, variables Ex[0] to Ex[the number of reference images−1], FoundNum, and a variable Rank (Step 2301), respectively.

RID=0
FirstF[0] to FirstF[the number of reference images−1]=1
ActiveCount=0
ReadID=0
Ex[0] to Ex[the number of reference images−1]=0
FoundNum=0
Rank=0

Next, the reconstruction unit 1014 compares ActiveCount with the number of reference images (Step 2302). When ActiveCount is smaller than the number of reference images (Step 2302, YES), the reconstruction unit 1014 sets RID to ReadID (Step 2303). On the contrary, when ActiveCount reaches the number of reference images (Step 2302, NO), the reconstruction unit 1014 executes processing in Step 2304 and subsequent steps.

Next, the reconstruction unit 1014 compares ReadID with RID (Step 2304). When ReadID does not match RID (Step 2304, NO), the determination unit 1015 executes processing in Step 2329 and subsequent steps.

On the contrary, when ReadID matches RID (Step 2304, YES), the reconstruction unit 1014 reads the format bit of one endpoint from the storage area[RID][Idx] of the storage unit 1013 (Step 2305). Next, the reconstruction unit 1014 reads the integer value d of the bit width indicated by the read format bit from the storage area[RID][Idx] of the storage unit 1013 (Step 2306). Then, the reconstruction unit 1014 checks whether the base coordinate[RID][Idx] is the X-coordinate or the Y-coordinate (Step 2307).

When the base coordinate[RID][Idx] is the X-coordinate (Step 2307, YES), the reconstruction unit 1014 compares FirstF[RID] with 1 (Step 2308). When FirstF[RID] is 1 (Step 2308, YES), the reconstruction unit 1014 sets d/GS to X[RID][Idx], and sets d/GS to the variable LX (Step 2309). Then, the reconstruction unit 1014 sets 0 to FirstF[RID] (Step 2310).

On the contrary, when FirstF[RID] is 0 (Step 2308, NO), the reconstruction unit 1014 sets a value of a right side of a following equation to X[RID][Idx] (Step 2311).

$$X[RID][Idx]=LX+d*\text{sign}[RID][Idx]/GS \qquad (21)$$

Next, the reconstruction unit 1014 uses (a, b) in the epipolar line information[RID][Idx] to calculate Y[RID][Idx] by a following equation (Step 2312).

$$Y[RID][Idx]=a*X[RID][Idx]+b \qquad (22)$$

When the base coordinate[RID][Idx] is the Y-coordinate (Step 2307, NO), the reconstruction unit 1014 compares FirstF[RID] with 1 (Step 2313). When FirstF[RID] is 1 (Step 2313, YES), the reconstruction unit 1014 sets d/GS to Y[RID][Idx], and sets d/GS to a variable LY (Step 2314). Then, the reconstruction unit 1014 sets 0 to FirstF[RID] (Step 2315).

On the contrary, when FirstF[RID] is 0 (Step 2313, NO), the reconstruction unit 1014 sets a value of a right side of a following equation to Y[RID][Idx] (Step 2316).

$$Y[RID][Idx]=LY+d*\text{sign}[RID][Idx]/GS \qquad (23)$$

Next, the reconstruction unit 1014 uses (a, b) of the epipolar line information[RID][Idx] to calculate X[RID][Idx] by a following equation (Step 2317).

$$X[RID][Idx]=Y[RID][Idx]/a-b/a \qquad (24)$$

Next, the reconstruction unit 1014 uses the mapping information M2[RID] to map the point (X[RID][Idx], Y[RID][Idx]) in the reference image identified by RID onto a straight line of the target image in the depth direction, thereby calculating z[RID][Idx] (Step 2318).

Next, the reconstruction unit 1014 compares ActiveCount with the number of reference images (Step 2319). When ActiveCount is smaller than the number of reference images (Step 2319, YES), the reconstruction unit 1014 increments ActiveCount by 1 (Step 2320), and compares RID with the number of reference images (Step 2329).

When RID is smaller than the number of reference images (Step 2329, YES), the reconstruction unit 1014 increments RID by 1 (Step 2330), and repeats the processing in Step 2302 and subsequent steps. On the contrary, when RID reaches the number of reference images (Step 2329, NO), the reconstruction unit 1014 sets 0 to RID (Step 2331), and repeats the processing in Step 2302 and subsequent steps.

When ActiveCount reaches the number of reference images (Step 2319, NO), the determination unit 1015 finds the minimum value z[RID][Idx] among z[0][Idx] to z[the number of reference images−1][Idx] (Step 2321). For example, the determination unit 1015 may find the minimum value z[RID][Idx] by merge sort or the like.

Next, the determination unit 1015 sets RID of the minimum value z[RID][Idx] to ReadID (Step 2322), and compares Ex[ReadID] with 1 (Step 2323).

When Ex[ReadID] is 0 (Step 2323, NO), the determination unit 1015 sets 1 to Ex[ReadID], and increments Rank by 1 (Step 2324). In this case, z[ReadID][Idx] corresponds to the nearer endpoint (front surface of the object) to the base camera out of two endpoints of the line segment on the z-axis.

On the contrary, when Ex[ReadID] is 1 (Step 2323, YES), the determination unit 1015 sets 0 to Ex[ReadID], and decrements Rank by 1 (Step 2325). In this case, z[ReadID][Idx] corresponds to the further endpoint (back surface of the object) from the base camera out of the two endpoints of the line segment on the z-axis.

Next, the determination unit 1015 compares Rank with discontinuation Rank number (Step 2326). A value that is equal to or smaller than the number of reference images may be used as the discontinuation Rank number. To smooth out an error caused by imaging conditions or mask image generation processing, a value less than the number of reference images may be used as the discontinuation Rank number.

When Rank is larger than the discontinuation Rank number (Step 2326, YES), the determination unit 1015 increments FoundNum by 1 (Step 2327). On the contrary, when Rank is equal to or smaller than the discontinuation Rank number (Step 2326, NO), the determination unit 1015 executes processing in Step 2328 and subsequent steps.

Next, the determination unit 1015 compares FoundNum with discontinuation number (Step 2328). The discontinuation number denotes the number of front surfaces or back surfaces of the object on the z-axis when viewed from the base camera. For example, to find the first front surface on the z-axis, the discontinuation number is set at 1, and to find the first back surface on the z-axis (front-back), the discontinuation number is set at 2. To find the second front surface on the z-axis (front-back-front), the discontinuation number is set at 3.

When FoundNum is equal to or smaller than the discontinuation number (Step 2328, NO), the determination unit 1015 executes processing in Step 2329 and subsequent steps. On the contrary, when FoundNum exceeds the discontinuation number (Step 2328, YES), the determination unit 1015 outputs z[ReadID][Idx] as a distance information z (Step 2332).

In the VisualHull processing in FIG. 18, since the line segment search processing on each epipolar line in one reference image may be individually executed, the line segment search processing may be executed on a plurality of epipolar lines in parallel. Similarly, since the overlap determination processing of each pixel of the object region in the mask image of the target image may be individually, the overlap determination processing on a plurality of pixels of the object region may be executed in parallel.

Figure 24:
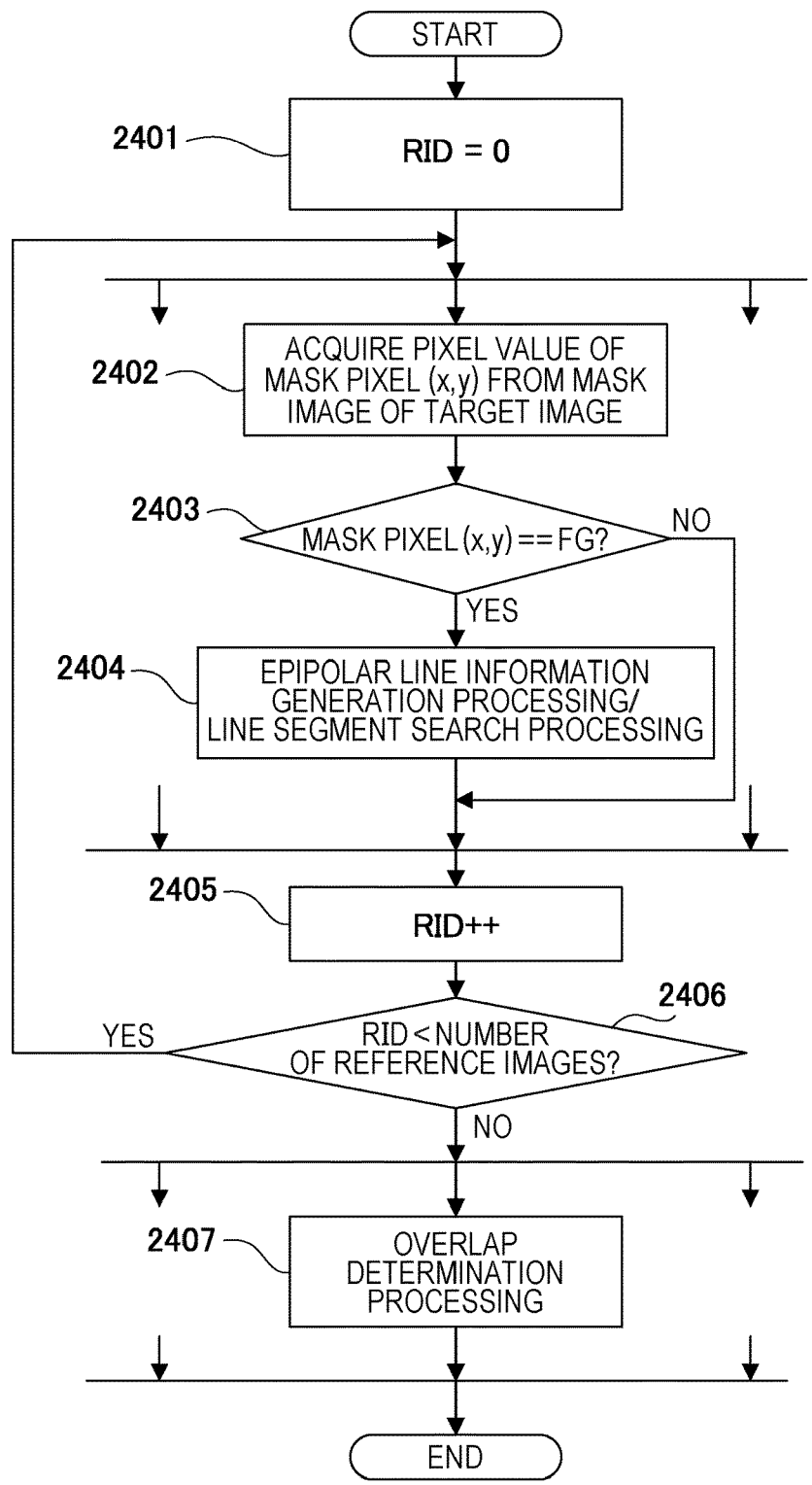
FIG. 24 is a flow chart of parallel VisualHull processing.

FIG. 24 is a flowchart illustrating an example of the VisualHull processing in which the line segment search processing and the overlap determination processing are executed in parallel. First, the line segment search unit 1702 sets an initial value 0 to RID (Step 2401), and applies the processing in Step 2402 to Step 2404 to the plurality of mask pixels (x, y) in the mask image of the target image in parallel.

The line segment search unit 1702 acquires the pixel value of the mask pixel (x, y) from the mask image of the target image (Step 2402), and checks whether or not the pixel value of the mask pixel (x, y) is FG (Step 2403). When the pixel value of the mask pixel (x, y) is FG (Step 2403, YES), the line segment search unit 1702 executes the epipolar line information generation processing in Step 1806 and the line segment search processing in Step 1807 in FIG. 18 (Step 2404). On the contrary, the pixel value of the mask pixel (x, y) is not FG (Step 2403, NO), the line segment search unit 1702 skips the processing in Step 2404.

Next, the line segment search unit 1702 increments RID by 1 (Step 2405), and compares RID with the number of reference images (Step 2406). When RID is smaller than the number of reference images (Step 2406, YES), the line segment search unit 1702 executes processing in Step 2402 and subsequent steps.

Then, when RID reaches the number of reference images (Step 2406, NO), the determination unit 1015 applies the overlap determination processing in Step 2407 to a plurality of mask pixels (x, y) in the mask image of the target image in parallel. In Step 2407, the determination unit 1015 executes the overlap determination processing in Step 1817 in FIG. 18.

In the VisualHull processing in FIG. 24, loop processing on RID may be further parallelized. The parallel processing on the mask pixel (x, y) may be changed to the loop processing to parallelize the loop processing on RID.

The information processing apparatus 1001 in FIG. 17 may transform the base coordinate of the endpoint of the line segment searched in the line segment search processing into the difference between the base coordinate and the base coordinate of another endpoint to reduce the data amount of the line segment end coordinates.

This may minimize the access amount to a main memory having a large latency, thereby minimizing the effect of the latency. Further, a compact local memory having a small latency may be effectively used as the storage unit 1013, thereby minimizing the effect of the latency caused by the access to the main memory having a large latency. The performance of the overlap determination processing may be improved by increasing the usage efficiency of the local memory, and minimizing the overheads caused by reading the line segment end coordinates from the main memory.

Figure 25:
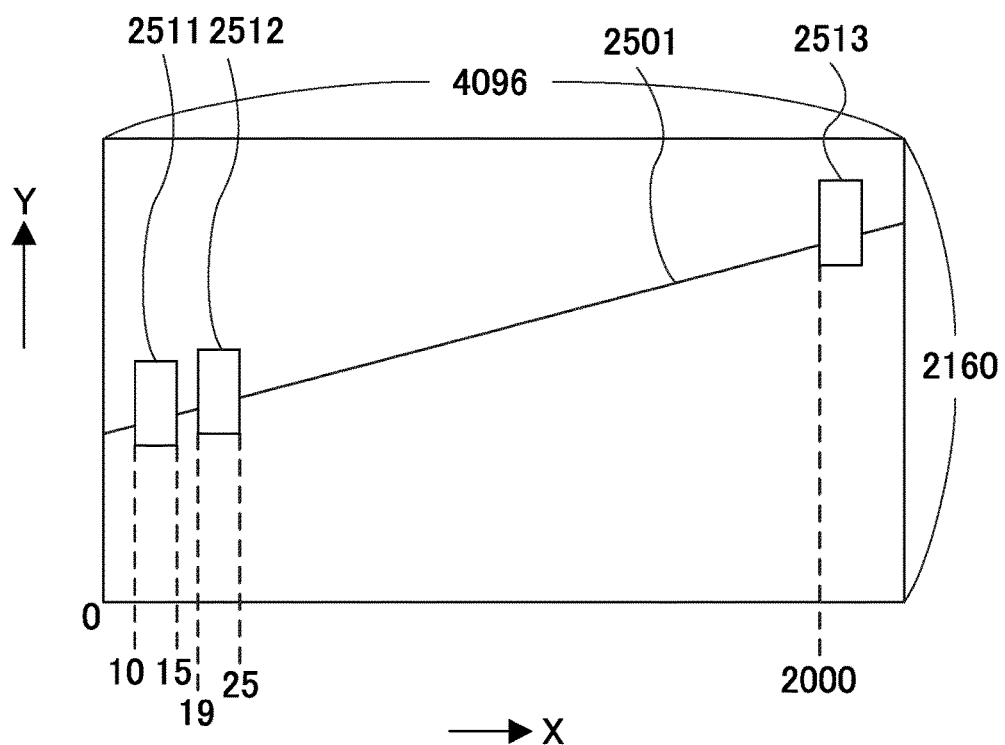
FIG. 25 is a view illustrating a search result of line segment search processing.

FIG. 25 illustrates an example of a search result of the line segment search processing on the epipolar line. The mask image of the reference image in FIG. 25 has a resolution of 4096×2160, and an object regions 2511 to 2513 exist on an epipolar line 2501.

In this example, two intersections of the boundary of the object region 2511 and the epipolar line 2501, two intersections of the boundary of the object region 2512 and the epipolar line 2501, and one intersection of the boundary of the object region 2513 and the epipolar line 2501 are detected as endpoints of the line segment. X-coordinates of the five endpoints are 10, 15, 19, 25, and 2000.

The difference between the X-coordinate values of the two endpoints on the boundary of the same object region is small. In the case where two object regions such as the object region 2511 and the object region 2512 are close to each other, the difference between the X-coordinate values of the endpoint on the boundary of one object region and the endpoint on the boundary of the other object region is small. On the contrary, in the case where two object regions such as the object region 2512 and the object region 2513 are away from each other, the difference between the X-coordinate values of the endpoint on the boundary of one object region and the endpoint on the boundary of the other object region is large.

The difference between the X-coordinate values of the first endpoint (X=10) and the second endpoint (X=15) is 5, and the difference between the X-coordinate values of the second endpoint (X=15) and the third endpoint (X=19) is 4. The difference between the X-coordinate values of the third endpoint (X=19) and the fourth endpoint (X=25) is 6, and the difference between the X-coordinate values of the fifth endpoint (X=2000) and the fourth endpoint (X=25) is 1975.

FIGS. 26A and 26B illustrate an example of the storage area that stores the search result in FIG. 25. FIG. 26A illustrates an example of a conventional storage area in which the X-coordinate value of each endpoint is stored as a half-precision floating point variable. In this case, each X-coordinate value may be stored as 16 bits of half-precision floating point variable, and the total number of bits is as follows: 16 bits×5=80 bits.

FIG. 26B illustrates an example of the storage area of the storage unit 1013 in FIG. 17. In this case, Inc=GS=1, the X-coordinate values of the second to fifth endpoints are transformed into the respective coordinate value differences, and the differences between the X-coordinate value of the first endpoint, and each of the X-coordinate values of the second to fifth endpoints are stored as the integer variables. Accordingly, the integer values stored in the storage area are 10, 5, 4, 6, and 1975.

Among the values, 10, 5, 4, and 6 are stored in 8 bits of integer variable INT8, 1975 is stored in 16 bits of integer variable INT16, and the first bit of each integer variable is used as the format bit. When the integer variable is INT8, "0" is stored in the format bit, and when the integer variable is INT16, "1" is stored in the format bit.

The total number of bits of four INT8 and one INT16 is 8 bits×4+16 bits=48 bits, and is decreased from the storage area in FIG. 26A by 32 bits.

To reconstruct the original X-coordinate values from the five integer values, the integer value of the bit width indicated by the format bit is read from each integer variable. Then, the first integer value 10 is used as the X-coordinate value of the first endpoint as it is, and the second to fifth integer values each are used as the difference from the X-coordinate value of the immediately preceding endpoint.

Accordingly, the X-coordinate value 15 of the second endpoint is reconstructed by adding the X-coordinate value 10 to the second integer value 5 of the first endpoint, and the X-coordinate 19 of the third endpoint is reconstructed by adding the X-coordinate value 15 of the second endpoint to the third integer value 4. The X-coordinate value 25 of the fourth endpoint is reconstructed by adding the X-coordinate value 19 of the third endpoint to the fourth integer value 6, and the X-coordinate value 2000 of the fifth endpoint is reconstructed by adding the X-coordinate value 25 of the fourth endpoint to the fifth integer value 1975.

To increase the accuracy of the X-coordinate that is the base coordinate, on the epipolar line 2501 in FIG. 25, Inc may be set at a value less than 1 to execute the line segment search processing. For example, given that Inc is set at 0.1, GS is set at 10, and the X-coordinate value is used as a fixed point number, the five integer values stored in the storage area of the storage unit 1013 become 100, 50, 40, 60, and 19750. Also in this case, as illustrated in FIG. 26B, the search results may be stored using four INT8 and one INT16.

The information processing apparatus 1001 in FIG. 17 may be applied to various video techniques such as free multi-viewpoint video, virtual reality (VR), augmented reality (AR).

FIG. 27 illustrates an example of free multi-viewpoint video generation processing of generating the free multi-viewpoint video by using the information processing apparatus 1001 in FIG. 17. A camera 2701-1 to a camera 2701-N (N is an integer of 3 or more) are disposed so as to surround a three dimensional region of an imaging target. For example, each camera 2701-$i$ (i=1 to N) has an imaging element such as charged-coupled device (CCD) and complementary metal-oxide-semiconductor (CMOS) to take a video of the object that exists in the three dimensional region of the imaging target. The video taken with each camera 2701-$i$ includes a plurality of camera images at a plurality of times.

Foreground separation processing 2702-$i$ is processing of generating the mask image including pixels representing the foreground that is the object region and pixels representing the other background, from each of camera images included in the video taken with the camera 2701-$i$. VisualHull processing 2703-$i$ is processing of extracting the three dimensional shape of the object from N mask images generated in the foreground separation processing 2702-1 to 2702-N, and generating the distance information z from the viewpoint of the camera 2701-$i$ to the object.

Rendering processing 2704 is processing of selecting some viewpoints among the viewpoints of the cameras 2701-1 to 2701-N, and using the distance information z, the camera images, and background information indicating the background region in the mask images at the selected viewpoints to generate a free viewpoint image. In the rendering processing 2704, the positional relation of each object viewed from user-designated free viewpoint (any viewpoint) is determined, and the foreground and the background are combined based on the determined positional relation. Then, the pixel value of the foreground is determined from the camera images to establish color of each pixel. This generates a free viewpoint image viewed from free viewpoints.

The number of foreground separation processing 2702-$i$ and the number of VisualHull processing 2703-$i$ may be the same as the number of cameras 2701-$i$, or may be different from the number of cameras 2701-$i$. In the VisualHull processing 2703-$i$, in the case where the three dimensional shape is extracted at proper accuracy by visual cone intersection method, the mask images of all cameras 2701-$i$ are not necessarily used.

The foreground separation processing 2702-$i$, the VisualHull processing 2703-$i$, and the rendering processing 2704 may be executed by one information processing apparatus, or may be executed by a plurality of information processing apparatuses through load distribution.

Figure 28:
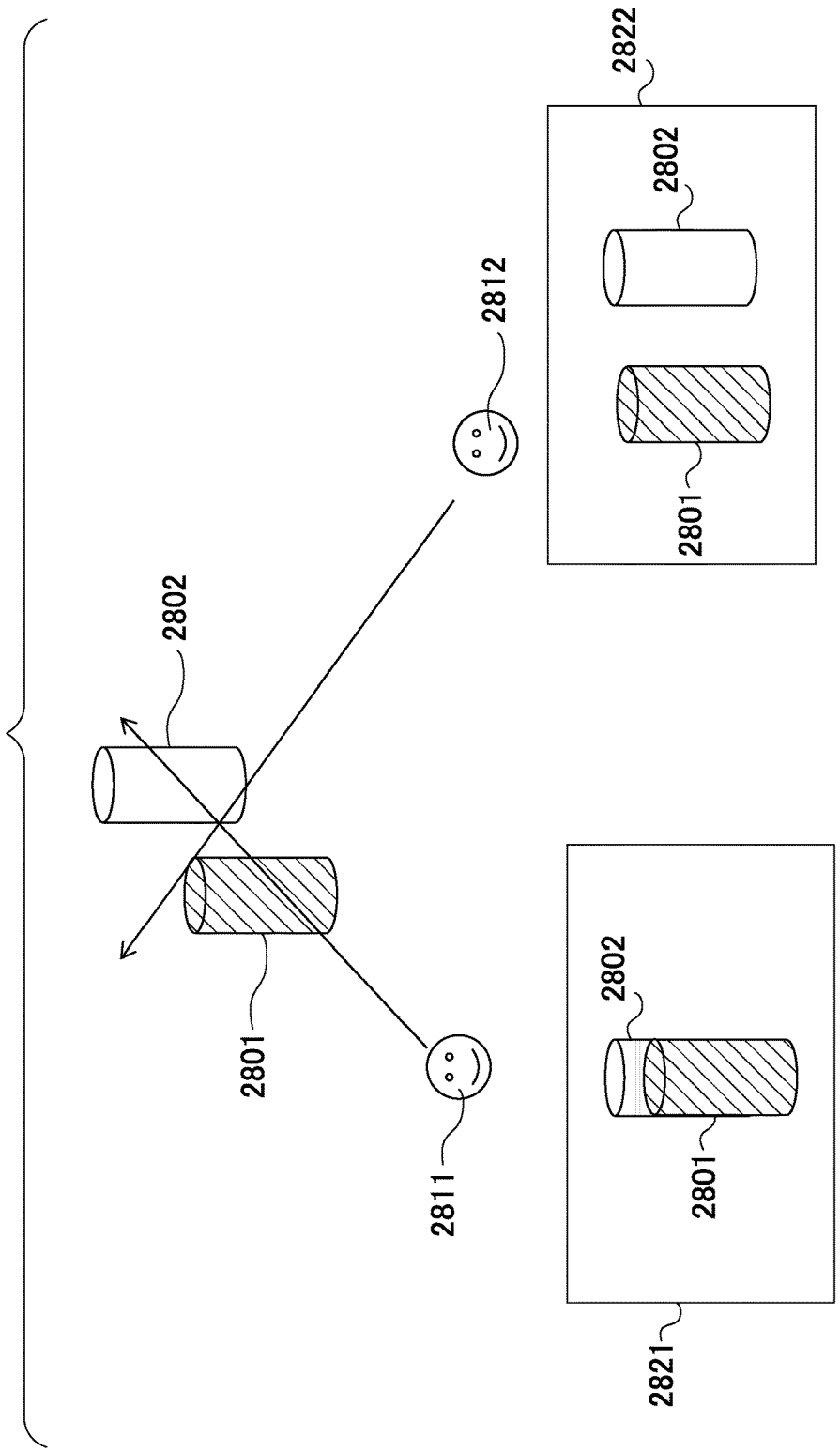
FIG. 28 is a view illustrating free viewpoint images.

FIG. 28 illustrates an example of free viewpoint images displayed by the rendering processing 2704 in FIG. 27. In the case where an object 2801 and an object 2802 exist in the three dimensional region of the imaging target, colors corresponding to front surfaces of the object 2801 and the object 2802 viewed from the designated viewpoints are drawn on the window to generate images viewed from the viewpoints.

For example, the object 2801 and object 2802 overlap each other in an image 2821 viewed from a viewpoint 2811, and the object 2801 is separated from the object 2802 in an image 2822 viewed from a viewpoint 2812. A free multi-viewpoint video is generated by connecting free viewpoint images at a plurality of time points in time series. Examples of the imaging target of the free multi-viewpoint video include a sport game and a music concert.

Figure 29:
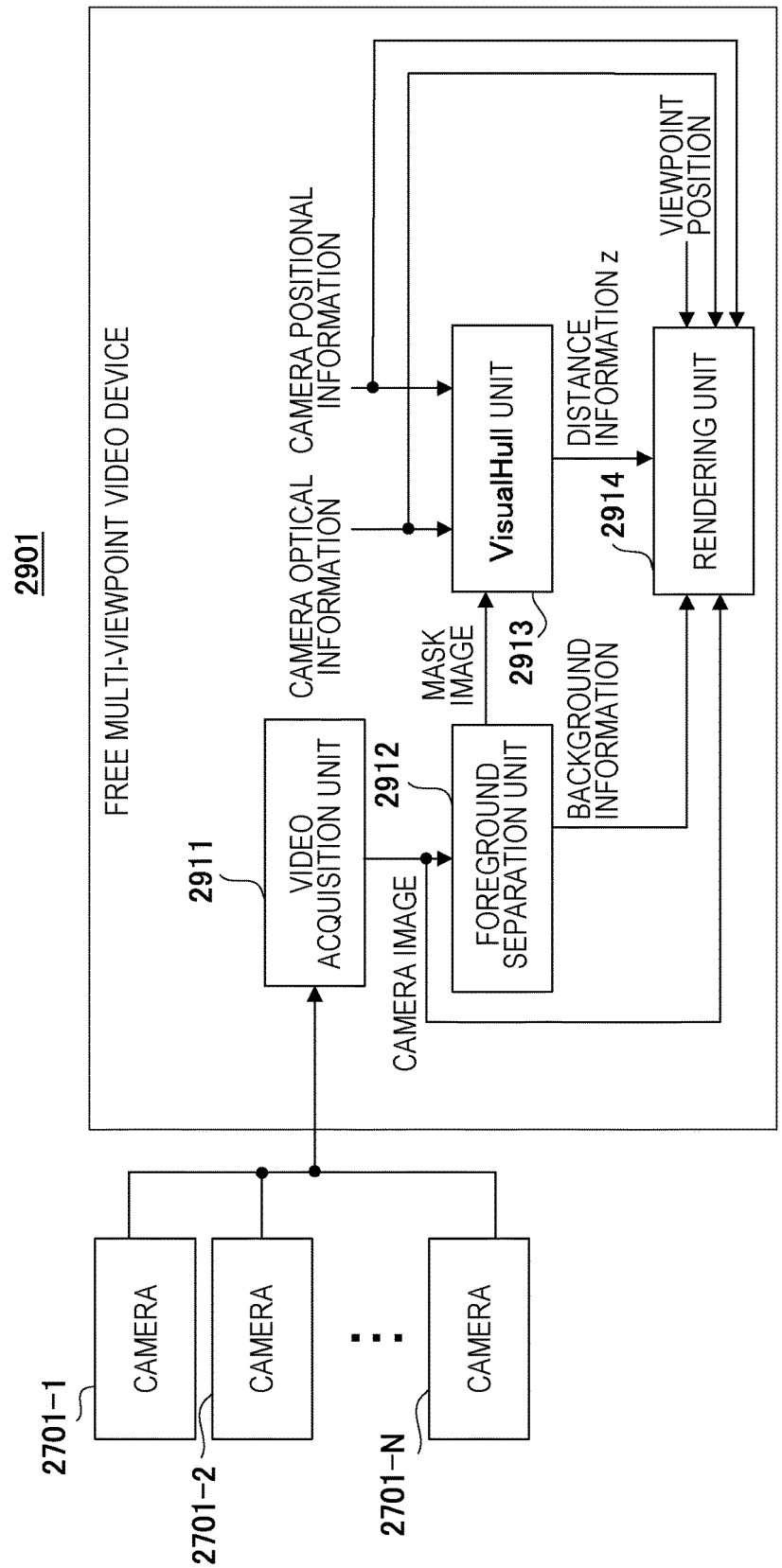
FIG. 29 is a view illustrating a functional configuration of a free multi-viewpoint video device.

FIG. 29 illustrates an example of a functional configuration of a free multi-viewpoint video device for executing the multi-viewpoint video generation processing in FIG. 27. A free multi-viewpoint video device 2901 in FIG. 29 includes a video acquisition unit 2911, a foreground separation unit 2912, a VisualHull unit 2913, and a rendering unit 2914. The VisualHull unit 2913 has the same configuration as the information processing apparatus 1001 in FIG. 17.

The video acquisition unit 2911 acquires a video taken with each of the cameras 2701-1 to 2701-N, and outputs camera images at respective time points, which are included in the acquired vide, to the foreground separation unit 2912 and the rendering unit 2914.

The foreground separation unit 2912 applies foreground separation processing to each of the camera images to generate the mask image. Then, the foreground separation unit 2912 outputs the generated mask image to the VisualHull unit 2913, and outputs background information indicating the background region in the mask image to the rendering unit 2914. The VisualHull unit 2913 executes the VisualHull processing by using the camera optical information and the camera positional information of each of the cameras 2701-1 to 2701-N and the mask image outputted from the foreground separation unit 2912, and outputs the distance information z to the rendering unit 2914.

The rendering unit 2914 executes rendering processing by using the user-designated viewpoints, the camera optical information, the camera positional information, the camera images, the background information, and the distance information z, to generate the free viewpoint image.

Figure 30:
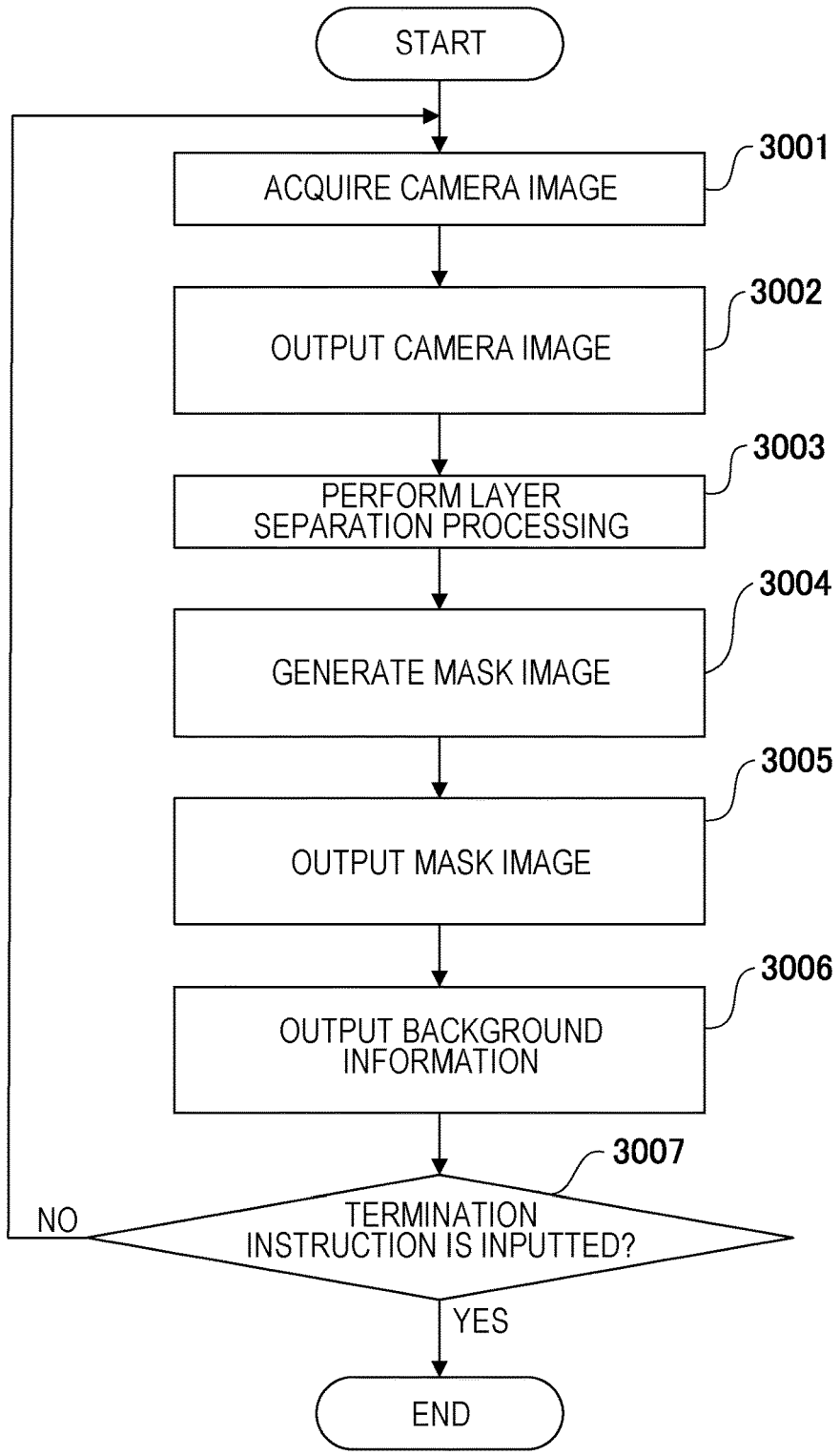
FIG. 30 is a flow chart of foreground separation processing.

FIG. 30 is a flowchart illustrating an example of the foreground separation processing executed by the foreground separation unit 2912 in FIG. 29. First, the video acquisition unit 2911 acquires the camera image at one time point from each of the cameras 2701-1 to 2701-N(Step 3001), and outputs the acquired camera images to the foreground separation unit 2912 and the rendering unit 2914 (Step 3002).

Next, the foreground separation unit 2912 applies layer separation processing to the camera images to generate the camera image in each layer (Step 3003). For example, when the camera 2701-$i$ is a stereo camera, the foreground separation unit 2912 may find the distance from parallax, and generate the camera image in the layer for each found distance.

Next, the foreground separation unit 2912 sets the pixel value indicating the foreground to each pixel in the object region, and the pixel value indicating the background to each pixel in the background region, in the camera image in the layer subjected to the VisualHull processing, to generate the mask image (Step 3004). Then, the foreground separation unit 2912 outputs the generated mask image to the VisualHull unit 2913 (Step 3005). When the camera 2701-$i$ is the stereo camera, the mask image of one of two camera images of the stereo camera is generated.

Next, the foreground separation unit 2912 outputs the background information indicating the background region in the generated mask image to the rendering unit 2914 (Step 3006). The background information includes three dimensional information of the background region, which is acquired by the layer separation processing for the camera image. The accuracy of the three dimensional information acquired by the layer separation processing is lower than the accuracy of the three dimensional information acquired by the VisualHull processing, but is sufficient for drawing the background region.

Next, the foreground separation unit 2912 checks whether or not a termination instruction has been input by the user (Step 3007). When the termination instruction is not inputted (Step 3007, NO), the free multi-viewpoint video device 2901 repeats processing in Step 3001 and subsequent steps for the camera image at the next time point. When the termination instruction is inputted (Step 3007, YES), the free multi-viewpoint video device 2901 terminates its processing.

Figure 31:
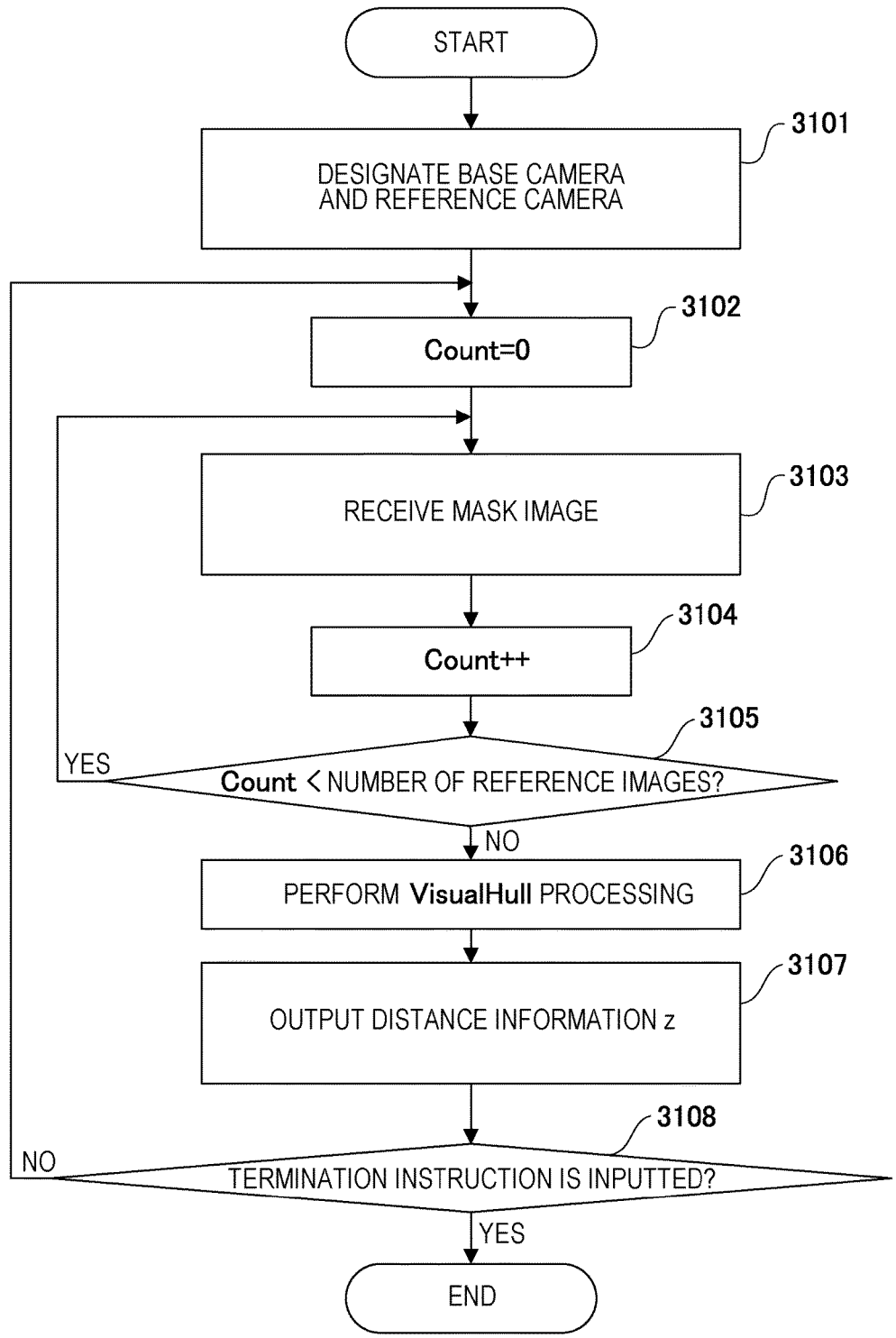
FIG. 31 is a flow chart of VisualHull processing executed by a VisualHull unit.

FIG. 31 is a flowchart illustrating an example of the VisualHull processing executed by the VisualHull unit 2913 in FIG. 29. First, the VisualHull unit 2913 selects the base camera from the cameras 2701-1 to 2701-N, and designates the other cameras as the reference cameras (Step 3101).

Next, the VisualHull unit 2913 sets an initial value 0 to a variable Count (Step 3102), and receives one mask image among mask images of a plurality of reference images outputted from the foreground separation unit 2912 at one time point (Step 3103). Then, the VisualHull unit 2913 increments Count by 1 (Step 3104), and compares Count with the number of reference images (Step 3105).

When Count is smaller than the number of reference images (Step 3105, YES), VisualHull unit 2913 repeats processing in Step 3103 and subsequent steps. When Count reaches the number of reference images (Step 3105, NO), the VisualHull unit 2913 executes the VisualHull processing in FIG. 18 (Step 3106), and outputs the distance information z to the rendering unit 2914 (Step 3107).

Next, the VisualHull unit 2913 checks whether or not a termination instruction has been input by the user (Step 3108). When the termination instruction is not input (Step 3108, NO), the VisualHull unit 2913 executes processing in Step 3102 and subsequent steps for the mask image at the next time point. When the termination instruction is input (Step 3108, YES), the VisualHull unit 2913 terminates its processing.

Figure 32:
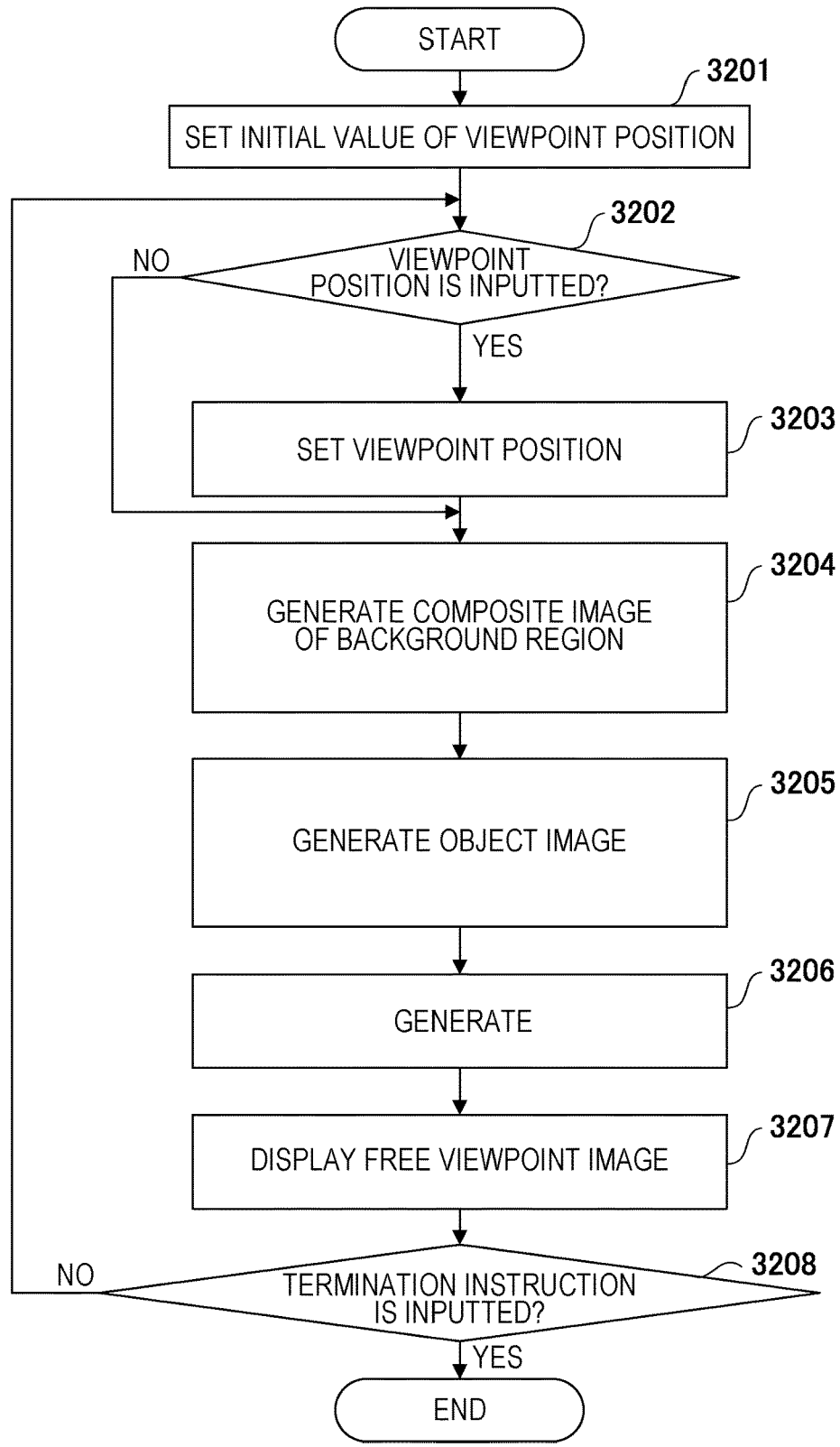
FIG. 32 is a flow chart of rendering processing.

FIG. 32 is a flowchart illustrating an example of rendering processing executed by the rendering unit 2914 in FIG. 29. First, the rendering unit 2914 sets an initial value of the viewpoint position (Step 3201), and checks whether or not the viewpoint position has been input by the user (Step 3202). When the viewpoint position is input (Step 3202, YES), the rendering unit 2914 sets the input viewpoint position (Step 3203). On the contrary, when the viewpoint position is not input (Step 3202, NO), the rendering unit 2914 executes processing in Step 3204 and subsequent steps.

Next, the rendering unit 2914 generates a composite image of the background region (Step 3204). In Step 3204, first, the rendering unit 2914 selects a plurality of camera images corresponding to the set viewpoint positions among the camera images of the cameras 2701-1 to 2701-N at one time point, and extracts the image of the background region from the selected camera images.

Next, using the camera optical information, the camera positional information, the set viewpoint position, and the background information output from the foreground separation unit 2912, the rendering unit 2914 transforms the selected camera images into a coordinate system at the viewpoint position. Then, the rendering unit 2914 combines pixel values of the plurality of transformed camera images by using weighted average, optical correction or the like, to generate a composite image of the background region.

Next, the rendering unit 2914 uses the distance information z output from the VisualHull unit 2913 to establish the three dimensional shape of the object, and transforms the established three dimensional shape into the coordinate system at the viewpoint position to generate an object image in the object region (Step 3205). For example, the rendering unit 2914 applies a transformation operation such as rotation, scaling-up, or scaling-down to the established three dimensional shape, thereby positioning the three dimensional shape.

Next, the rendering unit 2914 combines the composite image in the background region and the object image to generate a free viewpoint image viewed from the viewpoint position (Step 3206), and displays the generated free viewpoint image on a window (Step 3207).

Next, the rendering unit 2914 checks whether or not a termination instruction has been input by the user (Step 3208). When the termination instruction is not inputted (Step 3208, NO), the rendering unit 2914 executes processing in Step 3202 and subsequent steps for the camera image at the next time point. When the termination instruction is inputted (Step 3208, YES), the rendering unit 2914 terminates its processing.

Figure 33:
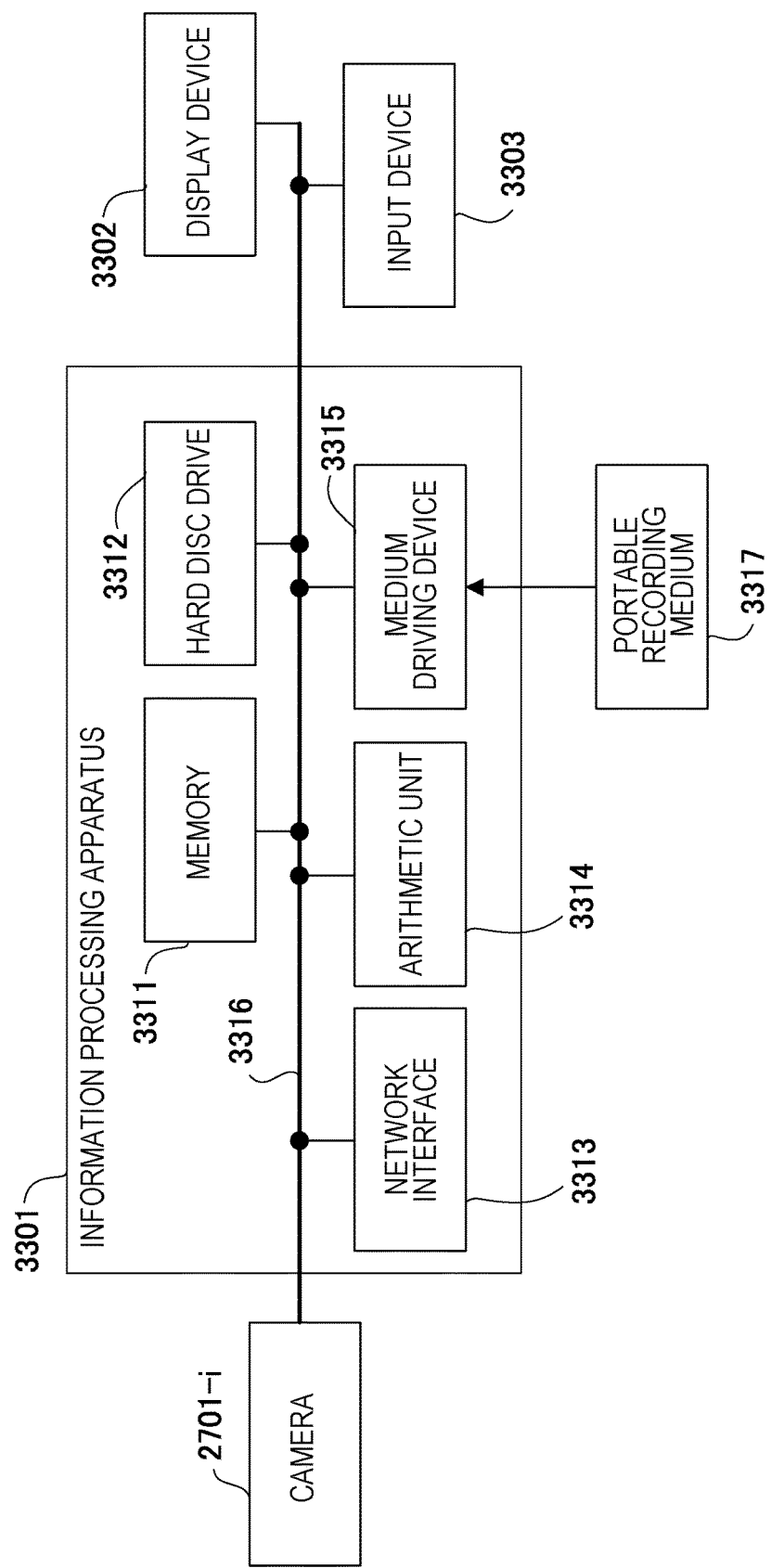
FIG. 33 is a hardware configuration view of an information processing apparatus.

FIG. 33 illustrates an example of a hardware configuration of the information processing apparatus used as the information processing apparatus 1001 in FIGS. 10 and 17, or the free multi-viewpoint video device 2901 in FIG. 29. An information processing apparatus 3301 in FIG. 33 includes a memory 3311, a hard disc drive 3312, a network interface 3313, an arithmetic unit 3314, and a medium driving device 3315. The constituents are interconnected via a bus 3316. The bus 3316 is coupled to the camera 2701-$i$, a display device 3302, and input device 3303.

The memory 3311 is a semiconductor memory such as a read only memory (ROM), a random access memory (RAM), and a flash memory, and stores programs and data used for processing. The memory 3311 may be used as the storage unit 1013 in FIGS. 10 and 17.

The arithmetic unit 3314 is a central processing unit (CPU), a graphics processing unit (GPU), a field-programmable gate array (FPGA), a dedicated hardware circuit or the like. The arithmetic unit 3314 operates as the generation unit 1011 in FIG. 10, and the transformation unit 1012, the reconstruction unit 1014, and the determination unit 1015 in FIGS. 10 and 17. The arithmetic unit 3314 also operates as the mapping information generation unit 1701 and the line segment search unit 1702 in FIG. 17, and the video acquisition unit 2911, the foreground separation unit 2912, and the VisualHull unit 2913, and the rendering unit 2914 in FIG. 29.

For example, when the arithmetic unit 3314 is a CPU (processor), the arithmetic unit 3314 uses the memory 3311 to run a program, thereby executing the image processing, the VisualHull processing, or the free multi-viewpoint image generation processing.

The hard disc drive 3312 is a magnetic disc device for storing programs and data used for processing. The information processing apparatus 3301 may load the programs and data stored in the hard disc drive 3312 into the memory 3311. In place of the hard disc drive 3312, an auxiliary storage device such as an optical device, a magneto-optical disc device, or a tape device may be used.

The network interface 3313 is a communication interface circuit that is coupled to a communication network such as Local Area Network and Wide Area Network, and performs data transformation associated with communication. The information processing apparatus 3301 may receive programs and data from an external apparatus via the network interface 3313, and load them into the memory 3311.

The medium driving device 3315 drives a portable recording medium 3317, and accesses contents recorded therein. The portable recording medium 3317 is a memory device, a flexible disc, an optical disc, a magneto-optical disc, or the like. The portable recording medium 3317 is a compact disk read only memory (CD-ROM), a digital versatile disk (DVD), a Universal Serial Bus (USB) memory, or the like. The operator or the user may store programs and data in the portable recording medium 3317, and load them into the memory 3311 for later usage.

A computer-readable recording medium that stores such programs and data is a physical (non-transitory) recording medium such as the memory 3311, the hard disc drive 3312, or the portable recording medium 3317.

The input device 3303 is, for example, a keyboard, a pointing device, or the like, and is used to input a user's instruction or information. The display device 3302 displays an inquiry or instruction to the operator or the user, and a processing result on the window. The processing result may be the distance information z or the free multi-viewpoint image.

8 bits, 16 bits, 32 bits, and 64 bits of variables are defined as general variables used in the program. For this reason, when the arithmetic unit 3314 is CPU, GPU, or the like, these bit widths may be used as formats of the storage area of the storage unit 1013.

However, if the data amount of the line segment end coordinates is to be further reduced, or of the arithmetic unit 3314 is an FPGA, a dedicated hardware circuit, or the like, the bit widths of 8 bits, 16 bits, 32 bits, and 64 bits are not necessarily used.

Even if any bit width is used as the format of the storage area, a format bit string of the proper number of bits indicating the bit width may be defined to store the line segment end coordinate values in the storage area. Then, the line segment end coordinate values may be read from the storage area by repeatedly reading the format bit string and data having the bit width indicated by the format bit string.

The information processing apparatus 1001 may include the plurality of arithmetic units 3314. In this case, the plurality of arithmetic units 3314 may execute the image processing, the VisualHull processing, or the free multi-viewpoint image generation processing in parallel.

Figure 34:
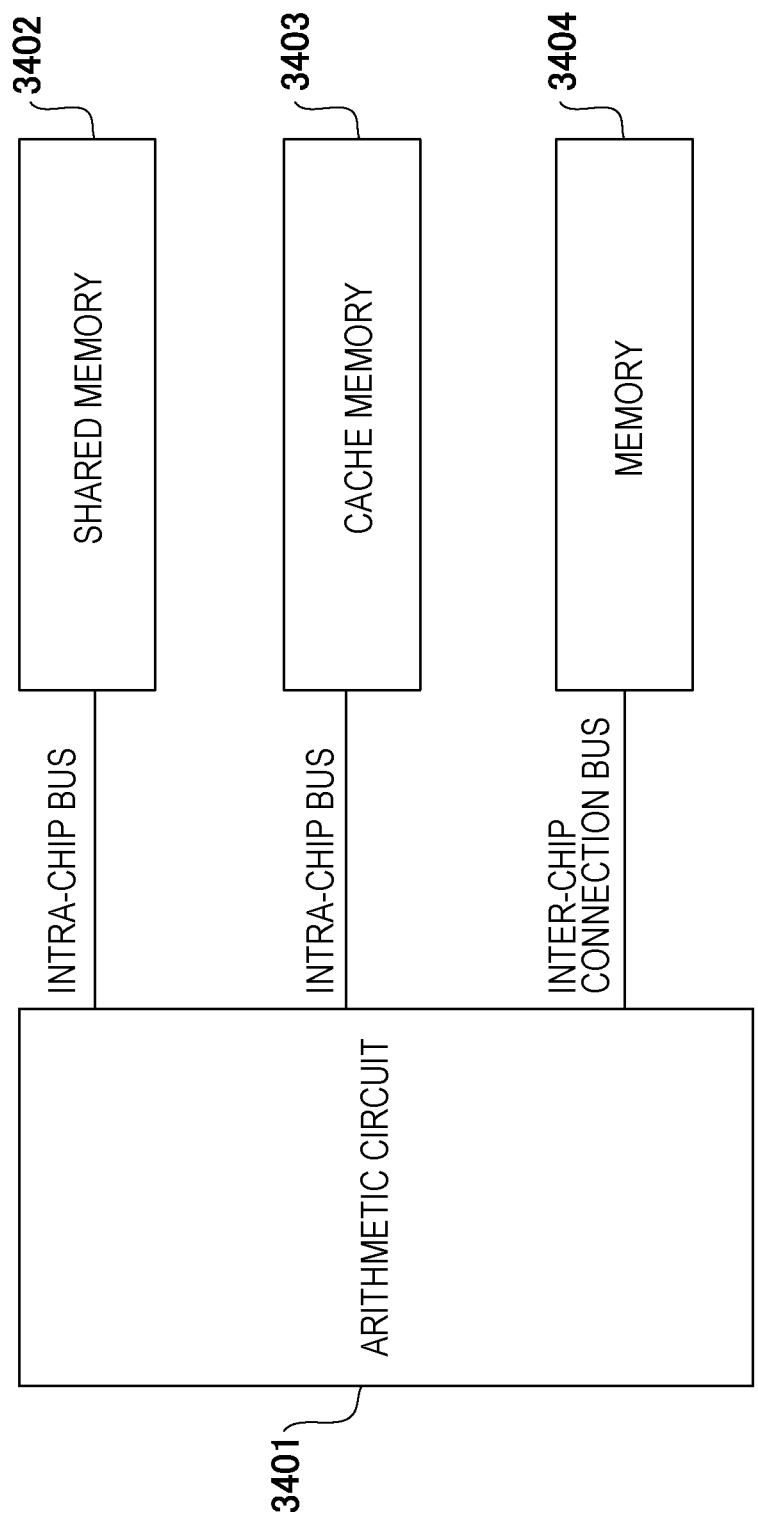
FIG. 34 is a view illustrating a local memory.

FIG. 34 illustrates an example of the local memory in the arithmetic unit 3314 in FIG. 33. The arithmetic unit 3314 includes an arithmetic circuit 3401, a shared memory 3402, and a cache memory 3403.

The shared memory 3402 and the cache memory 3403 correspond to the local memory, and are coupled to the arithmetic circuit 3401 via an intra-chip bus. A memory 3404 corresponds to a global memory (off-chip memory), and is coupled to the arithmetic circuit 3401 via an inter-chip connection bus. The memory 3311 in FIG. 33 corresponds to the memory 3404. The inter-chip connection bus has a smaller transmission bandwidth and a larger latency than the intra-chip bus.

The shared memory 3402 and the cache memory 3403 each have a small capacity, and the memory 3404 has a large capacity. The user may control data arrangement in the shared memory 3402 and the memory 3404. Meanwhile, data arrangement in the cache memory 3403 is controlled by a cache management mechanism.

The shared memory 3402, the cache memory 3403, and the memory 3404 may be used as the storage unit 1013 in FIGS. 10 and 17. In the case where the data amount of the line segment end coordinate values is sufficiently small, the shared memory 3402 and the cache memory 3403 are mainly used as the storage unit 1013.

Figure 35:
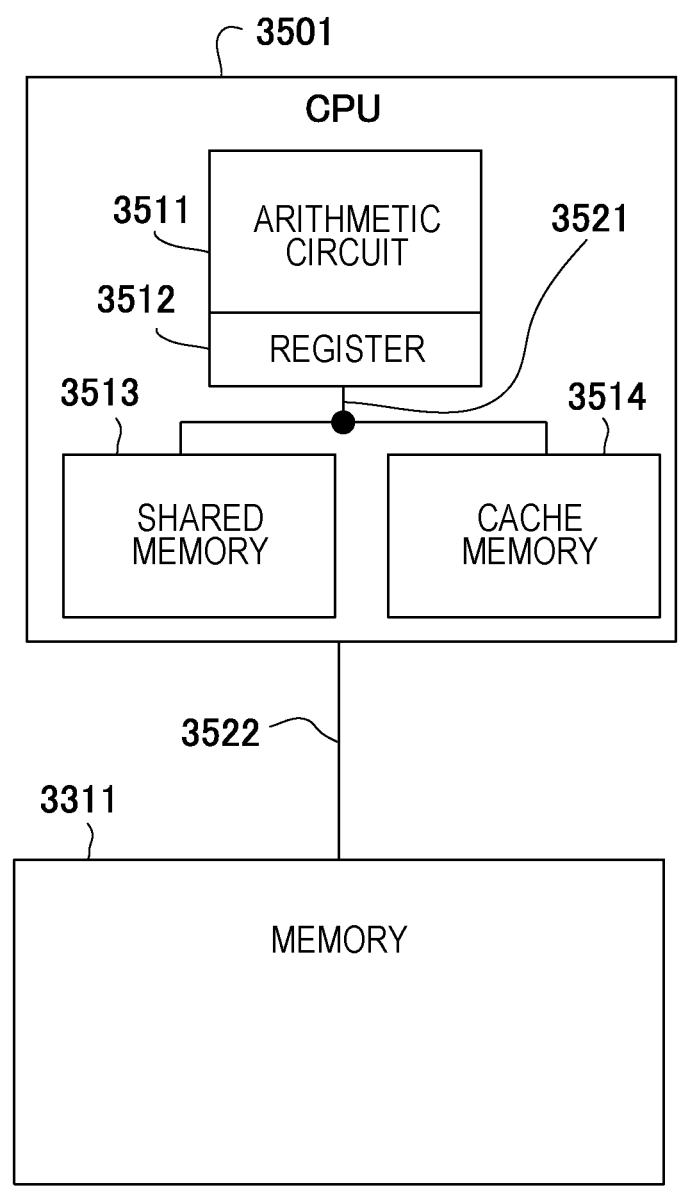
FIG. 35 is a first configuration view of an arithmetic unit.

FIG. 35 illustrates a first configuration example of the arithmetic unit 3314 in FIG. 33. A CPU 3501 in FIG. 35 corresponds to the arithmetic unit 3314, and includes an arithmetic circuit 3511, a register 3512, a shared memory 3513, and a cache memory 3514. The shared memory 3513 and the cache memory 3514 are coupled to the arithmetic circuit 3511 via an intra-chip bus 3521. Meanwhile, the memory 3311 is coupled to the CPU 3501 via an inter-chip connection bus 3522.

The shared memory 3513, the cache memory 3514, and the memory 3311 may be used as the storage unit 1013 in FIGS. 10 and 17. In the case where the data amount of the line segment end coordinate values is sufficiently small, the shared memory 3513 and the cache memory 3514 are mainly used as the storage unit 1013.

FIG. 36 illustrates a second configuration example of the arithmetic unit 3314 in FIG. 33. A GPU 3602 and a memory 3603 are mounted on a board 3601 in FIG. 36. The GPU 3602 corresponds to the arithmetic unit 3314, and includes an arithmetic circuit 3611, a register 3612, a shared memory 3613, and a cache memory 3614. The shared memory 3613 and the cache memory 3614 are coupled to the arithmetic circuit 3611 via an intra-chip bus 3621.

The memory 3603 corresponds to a global memory, and is coupled to the GPU 3602 via an inter-chip connection bus 3622. The memory 3311 is coupled to the GPU 3602 on the board 3601 via an extension bus 3623. The extension bus 3623 is, for example, a peripheral component interconnect express (PCIExpress), and has a smaller transmission bandwidth than the inter-chip connection bus 3622.

The shared memory 3613, the cache memory 3614, the memory 3603, and the memory 3311 may be used as the storage unit 1013 in FIGS. 10 and 17. In the case where the data amount of the line segment end coordinate values is sufficiently small, the shared memory 3613 and the cache memory 3614 are mainly used as the storage unit 1013.

The configurations of the information processing apparatus 1001 in FIGS. 10 and 17 are merely examples, and some constituents may be omitted or changed according to the use or conditions of the information processing apparatus 1001. For example, in the information processing apparatus 1001 in FIG. 17, in the case where the mapping information M1[RID] and the mapping information M2[RID] are generated by an external device, the mapping information generation unit 1701 may be omitted.

The configuration of the free multi-viewpoint video device 2901 in FIG. 29 is merely an example, and some constituents may be omitted or changed according to the use or the conditions of the free multi-viewpoint video device 2901. For example, the free multi-viewpoint video device 2901 may include a display device for displaying the free multi-viewpoint image generated by the rendering unit 2914.

The flowcharts in FIGS. 11, 18 to 24, and 30 to 32 are merely examples, and some processing may be omitted or changed according to the configuration or conditions of the information processing apparatus 1001 or the free multi-viewpoint video device 2901.

The epipolar lines in FIGS. 1 to 3 and the silhouette cones in FIGS. 3 and 4 are merely examples, and the epipolar line and the silhouette cone vary according to the object to be imaged and the position of each camera.

The overlap determination processing in FIGS. 5, 7, and 16 is merely examples, and the overlap determination processing varies according to the search result of the line segment search processing. The mask image in FIG. 6 is merely an example, and the mask image varies according to the object to be imaged.

The configurations of the three dimensional shape construction unit 801 in FIGS. 8 and 9 are merely examples, some constituents may be omitted or changed according to the use or conditions of the three dimensional shape construction unit 801.

The line segment end coordinate values in FIGS. 12, 13, 25, 26A, and 26B are merely examples, and the line segment end coordinate values vary according to the search result of the line segment search processing. The method of selecting the line segment end coordinate values in FIGS. 14A and 14B and the method of determining the sign in FIG. 15 are merely examples, and any other suitable selection method and determination method may be used.

The free multi-viewpoint image generation processing in FIG. 27 is merely an example, and some processing may be omitted or changed according to the use or conditions of the free multi-viewpoint video device 2901. The free viewpoint image in FIG. 28 is merely an example, and the free viewpoint image varies according to the object to be imaged and the viewpoint position.

The information processing apparatus 3301 in FIG. 33, the memory configuration in FIG. 34, and the configurations of the arithmetic unit in FIGS. 35 and 36 are merely examples, and some constituents may be omitted or changed according to the use or conditions of the information processing apparatus 3301. For example, in the information processing apparatus 3301 in FIG. 33, in the case where a communication network or the portable recording medium 3317 is not used, the network interface 3313 or the medium driving device 3315 may be omitted. In the case where the hard disc drive 3312 is not used, the hard disc drive 3312 may be omitted.

The equation (1) to the equation (24) are merely examples, and another equation may be used depending on the configuration or conditions of the information processing apparatus 1001.

The disclosed embodiment and advantages thereof have been described in detail. However, those ordinarily skilled in the art would make various changes, additions, and omissions without deviating from the scope of the present disclosure, which is clearly recited in claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and configured to:
obtain a second straight line by mapping a first straight line that passes a projection center of a target image taken by a first imaging device in a three dimensional space and a point representing an object in a projection plane of the first imaging device, onto each of a plurality of reference images respectively taken by a plurality of second imaging devices, and generate a reference line-segment representing an existing range of the object on the second straight line for each of the plurality of reference images;
transform, for each of the plurality of reference line-segments respectively generated on the plurality of reference images, a coordinate value of a first endpoint of the reference line-segment into a difference between a coordinate value of the first end point and a coordinate value of a second endpoint of the reference line-segment;
store the coordinate value of the second endpoint and the difference in the memory;

restore the coordinate value of the first endpoint from the coordinate value of the second endpoint and the difference stored in the memory; and map the coordinate value of the second endpoint and the restored coordinate value of the first endpoint, onto a depth-direction line that is perpendicular to the projection plane of the first imaging device, and determine overlap of a plurality of line-segments on the depth-direction line whose endpoints are mapped from each of the plurality of reference line-segments on the plurality of reference images.

2. The information processing apparatus of claim 1, wherein:

the processor obtains an equation of the second straight line, which is described based on a horizontal coordinate and a vertical coordinate of each of the plurality of reference images, by using mapping information for mapping a point in the three dimensional space onto each of the plurality of reference images;

the coordinate value of the second endpoint and the difference stored in the memory are each described as a first-coordinate value based on a first coordinate that is one of the horizontal coordinate and the vertical coordinate;

the processor:

restores a first-coordinate value of the first endpoint, from a first-coordinate value of the second endpoint stored in the memory and a difference between a first-coordinate value of the first end point and the first-coordinate value of the second endpoint, obtains, using the equation of the second straight line, a second-coordinate value of the second endpoint from the first-coordinate value of the second endpoint, the second coordinate value being a value described based on a second coordinate that is one of the horizontal coordinate and the vertical coordinate different from the first coordinate, obtains, using the equation of the second straight line, a second-coordinate value of the first endpoint, from the first-coordinate value of the first endpoint, and maps the first-coordinate value and the second-coordinate value of the first end point, and the first-coordinate value and the second-coordinate value of the second end point, onto the depth-direction line of the projection plane of the first imaging device.

3. The information processing apparatus of claim 1, wherein:

a difference between the first-coordinate values of the first and second endpoints is larger than a difference between the second-coordinate values of the first and second endpoints; and the first-coordinate value of the second endpoint and the difference between the first-coordinate values of the first and second endpoints are each described as an integer variable.

4. The information processing apparatus of claim 3, wherein:

the processor determines a bit width of the integer variable for representing the first-coordinate value of the second endpoint, based on the first-coordinate value of the second endpoint; and the processor determines a bit width of the integer variable for representing a difference between the first-coordinate values of the first and second endpoints, based on a value of the difference between the first-coordinate values of the first and second endpoints.

5. The information processing apparatus of claim 1, wherein:

the processor generates a first line-segment representing the existing range of the object on the second straight line, and generates a plurality of second line-segments representing existing ranges of one or more objects including the object;

the processor transforms a coordinate value of a first endpoint of each of the plurality of second line-segments into a difference between a coordinate value of the first endpoint and one of a coordinate value of a second endpoint of the second line-segment, a coordinate value of an endpoint of another second line-segment, and a coordinate value of one endpoint of the first line-segment;

the processor further stores the differences generated from coordinate values of endpoints of the plurality of second line-segments;

the processor reconstructs the coordinate values of the endpoints of the plurality of second line-segments from the differences generated from the coordinate values of the endpoints of the plurality of second line segments, and maps the reconstructed coordinate values of the endpoints of the plurality of second line-segments onto the depth-direction line of the projection plane of the first imaging device; and the processor determines overlap of the plurality of second line-segments generated from the plurality of reference images on the depth-direction line of the projection plane of the first imaging device.

6. A non-transitory, computer-readable recording medium having stored therein a program for causing a computer to execute a process comprising:

obtaining a second straight line by mapping a first straight line that passes a projection center of a target image taken by a first imaging device in a three dimensional space and a point representing an object in a projection plane of the first imaging device, onto each of a plurality of reference images respectively taken by a plurality of second imaging devices, and generating a reference line-segment representing an existing range of the object on the second straight line for each of the plurality of reference images;

transforming, for each of the plurality of reference line-segments respectively generated on the plurality of reference images, a coordinate value of a first endpoint of the reference line-segment into a difference between a coordinate value of the first end point and a coordinate value of a second endpoint of the reference line-segment;

storing the coordinate value of the second endpoint and the difference in a memory;

restoring the coordinate value of the first endpoint from the coordinate value of the second endpoint and the difference stored in the memory; and mapping the coordinate value of the second endpoint and the restored coordinate value of the first endpoint, onto a depth-direction line that is perpendicular to the projection plane of the first imaging device, and determining overlap of a plurality of line-segments on the depth-direction line whose endpoints are mapped from each of the plurality of reference line-segments on the plurality of reference images.

7. The non-transitory, computer-readable recording medium of claim 6, the process further comprising:

obtaining an equation of the second straight line, which is described based on a horizontal coordinate and a vertical coordinate of each of the plurality of reference images, by using mapping information for mapping a point in the three dimensional space onto each of the plurality of reference images, wherein the coordinate value of the second endpoint and the difference stored in the memory are each described as a first-coordinate value based on a first coordinate that is one of the horizontal coordinate and the vertical coordinate;

restoring a first-coordinate value of the first endpoint, from a first-coordinate value of the second endpoint stored in the memory and a difference between a first-coordinate value of the first end point and the first-coordinate value of the second endpoint;

obtaining, by using the equation of the second straight line, a second-coordinate value of the second endpoint from the first-coordinate value of the second endpoint, the second coordinate value being a value described based on a second coordinate that is one of the horizontal coordinate and the vertical coordinate different from the first coordinate;

obtaining, by using the equation of the second straight line, a second-coordinate value of the first endpoint, from the first-coordinate value of the first endpoint; and mapping the first-coordinate value and the second-coordinate value of the first end point, and the first-coordinate value and the second-coordinate value of the second end point, onto the depth-direction line of the projection plane of the first imaging device.

8. The non-transitory, computer-readable recording medium of claim 6, wherein:

a difference between the first-coordinate values of the first and second endpoints is larger than a difference between the second-coordinate values of the first and second endpoints; and the first-coordinate value of the second endpoint and the difference between the first-coordinate values of the first and second endpoints are each described as an integer variable.

9. The non-transitory, computer-readable recording medium of claim 8, the process further comprising:

determining a bit width of the integer variable for representing the first-coordinate value of the second endpoint, based on the first-coordinate value of the second endpoint; and determining a bit width of the integer variable for representing a difference between the first-coordinate values of the first and second endpoints, based on a value of the difference between the first-coordinate values of the first and second endpoints.

10. The non-transitory, computer-readable recording medium of claim 6, the process further comprising:

generating a first line-segment representing the existing range of the object on the second straight line, and generating a plurality of second line-segments representing existing ranges of one or more objects including the object;

transforming a coordinate value of a first endpoint of each of the plurality of second line-segments into a difference between a coordinate value of the first endpoint and one of a coordinate value of a second endpoint of the second line-segment, a coordinate value of an endpoint of another second line-segment, and a coordinate value of one endpoint of the first line-segment;

storing the differences generated from coordinate values of endpoints of the plurality of second line-segments;

reconstructing the coordinate values of the endpoints of the plurality of second line-segments from the differences generated from the coordinate values of the endpoints of the plurality of second line segments, and maps the reconstructed coordinate values of the endpoints of the plurality of second line-segments onto the depth-direction line of the projection plane of the first imaging device; and determining overlap of the plurality of second line-segments generated from the plurality of reference images on the depth-direction line of the projection plane of the first imaging device.

11. A method comprising:

obtaining a second straight line by mapping a first straight line that passes a projection center of a target image taken by a first imaging device in a three dimensional space and a point representing an object in a projection plane of the first imaging device, onto each of a plurality of reference images respectively taken by a plurality of second imaging devices, and generating a reference line-segment representing an existing range of the object on the second straight line for each of the plurality of reference images;

transforming, for each of the plurality of reference line-segments respectively generated on the plurality of reference images, a coordinate value of a first endpoint of the reference line-segment into a difference between a coordinate value of the first end point and a coordinate value of a second endpoint of the reference line-segment;

storing the coordinate value of the second endpoint and the difference in a memory;

restoring the coordinate value of the first endpoint from the coordinate value of the second endpoint and the difference stored in the memory; and mapping the coordinate value of the second endpoint and the restored coordinate value of the first endpoint, onto a depth-direction line that is perpendicular to the projection plane of the first imaging device, and determining overlap of a plurality of line-segments on the depth-direction line whose endpoints are mapped from each of the plurality of reference line-segments on the plurality of reference images.

12. The method of claim 11, further comprising:

obtaining an equation of the second straight line, which is described based on a horizontal coordinate and a vertical coordinate of each of the plurality of reference images, by using mapping information for mapping a point in the three dimensional space onto each of the plurality of reference images, wherein the coordinate value of the second endpoint and the difference stored in the memory are each described as a first-coordinate value based on a first coordinate that is one of the horizontal coordinate and the vertical coordinate;

restoring a first-coordinate value of the first endpoint, from a first-coordinate value of the second endpoint stored in the memory and a difference between a first-coordinate value of the first end point and the first-coordinate value of the second endpoint;

obtaining, by using the equation of the second straight line, a second-coordinate value of the second endpoint from the first-coordinate value of the second endpoint, the second coordinate value being a value described based on a second coordinate that is one of the horizontal coordinate and the vertical coordinate different from the first coordinate;

obtaining, by using the equation of the second straight line, a second-coordinate value of the first endpoint, from the first-coordinate value of the first endpoint; and mapping the first-coordinate value and the second-coordinate value of the first end point, and the first-coordinate value and the second-coordinate value of the second end point, onto the depth-direction line of the projection plane of the first imaging device.

13. The method of claim 11, wherein:
a difference between the first-coordinate values of the first and second endpoints is larger than a difference between the second-coordinate values of the first and second endpoints; and
the first-coordinate value of the second endpoint and the difference between the first-coordinate values of the first and second endpoints are each described as an integer variable.

14. The method of claim 13, further comprising:
determining a bit width of the integer variable for representing the first-coordinate value of the second endpoint, based on the first-coordinate value of the second endpoint; and
determining a bit width of the integer variable for representing a difference between the first-coordinate values of the first and second endpoints, based on a value of the difference between the first-coordinate values of the first and second endpoints.

15. The method of claim 11, further comprising:
generating a first line-segment representing the existing range of the object on the second straight line, and generating a plurality of second line-segments representing existing ranges of one or more objects including the object;
transforming a coordinate value of a first endpoint of each of the plurality of second line-segments into a difference between a coordinate value of the first endpoint and one of a coordinate value of a second endpoint of the second line-segment, a coordinate value of an endpoint of another second line-segment, and a coordinate value of one endpoint of the first line-segment;
storing the differences generated from coordinate values of endpoints of the plurality of second line-segments;
reconstructing the coordinate values of the endpoints of the plurality of second line-segments from the differences generated from the coordinate values of the endpoints of the plurality of second line segments, and maps the reconstructed coordinate values of the endpoints of the plurality of second line-segments onto the depth-direction line of the projection plane of the first imaging device; and
determining overlap of the plurality of second line-segments generated from the plurality of reference images on the depth-direction line of the projection plane of the first imaging device.

* * * * *